US011379804B2

(12) United States Patent
Kade et al.

(10) Patent No.: US 11,379,804 B2
(45) Date of Patent: Jul. 5, 2022

(54) REAL-TIME TRANSFER MANAGEMENT INTERFACE

(71) Applicant: The Toronto-Dominion Bank, Toronto (CA)

(72) Inventors: Carlos Alejandro Kade, Toronto (CA); Anne Marie Morissette, Toronto (CA); Vijay Kumar, Mississauga (CA); Caroline Bandiera, Toronto (CA); Adriann Teresa Coe, Pickering (CA)

(73) Assignee: The Toronto-Dominion Bank, Toronto (CA)

( * ) Notice: Subject to any disclaimer, the term of this patent is extended or adjusted under 35 U.S.C. 154(b) by 276 days.

(21) Appl. No.: 16/510,250

(22) Filed: Jul. 12, 2019

(65) Prior Publication Data

US 2020/0286051 A1 Sep. 10, 2020

Related U.S. Application Data

(63) Continuation-in-part of application No. 16/427,882, filed on May 31, 2019, now Pat. No. 11,086,675, (Continued)

(51) Int. Cl.
*G06Q 20/08* (2012.01)
(52) U.S. Cl.
CPC .................. *G06Q 20/085* (2013.01)
(58) Field of Classification Search
CPC ................................................... G06Q 20/085
See application file for complete search history.

(56) References Cited

U.S. PATENT DOCUMENTS 6,295,345 B1 * 9/2001 Pullen ............... H04Q 3/54525
379/283
7,308,428 B1 12/2007 Federspiel et al.
(Continued)

FOREIGN PATENT DOCUMENTS

CN 106886944 7/2017

OTHER PUBLICATIONS

USPTO; U.S. Office Action relating to U.S. Appl. No. 16/427,882; dated Dec. 24, 2020.
(Continued)

*Primary Examiner* — Scott C Anderson
*Assistant Examiner* — Raven E Zeer
(74) *Attorney, Agent, or Firm* — Rowand LLP

(57) ABSTRACT

In an aspect, a method performed at a server includes: receiving a message representing a request for a transfer; performing a series of automated processing operations on the message; providing, to a client device associated with an authenticated entity, a transfer interface, the transfer interface including an interface element for selecting the transfer; receiving an indication of a selection of the transfer; in response to receiving the indication of the selection, retrieving stage state data, the stage state data indicating a current one of the automated processing operations in the series; and sending, to the client device, an indication of the stage state data, wherein the client device is configured to update the transfer interface in response to receiving the indication to display a representation of the series of automated processing operations which identifies one of the processing operations in the series as a current processing operation.

20 Claims, 16 Drawing Sheets

Related U.S. Application Data which is a continuation-in-part of application No. 16/293,979, filed on Mar. 6, 2019, now Pat. No. 11,042,931.

(56) References Cited

U.S. PATENT DOCUMENTS

| | | | |
|---|---|---|---|
| 7,356,770 | B1 | 4/2008 | Jackson |
| 7,930,340 | B2 * | 4/2011 | Arunachalam ......... H04L 67/02 |
| | | | 709/219 |
| 8,074,873 | B1 | 12/2011 | Finkemeier et al. |
| 8,190,504 | B1 | 5/2012 | Stolz et al. |
| 8,725,609 | B2 | 5/2014 | Pawelczyk et al. |
| 9,058,627 | B1 | 6/2015 | Wasser et al. |
| 9,135,661 | B2 | 9/2015 | Chacko et al. |
| 9,753,758 | B1 * | 9/2017 | Oldenburg .......... H04L 41/0806 |
| 10,354,325 | B1 | 7/2019 | Skala et al. |
| 2002/0069082 | A1 | 6/2002 | Choe et al. |
| 2007/0127527 | A1 | 6/2007 | Dan et al. |
| 2008/0026359 | A1 * | 1/2008 | O'Malley ................ G09B 7/06 |
| | | | 434/323 |
| 2008/0183639 | A1 | 7/2008 | DiSalvo |
| 2009/0192873 | A1 * | 7/2009 | Marble .................. G06Q 20/10 |
| | | | 705/14.1 |
| 2012/0130731 | A1 * | 5/2012 | Canetto ................ G06Q 10/10 |
| | | | 705/2 |
| 2013/0080641 | A1 | 3/2013 | Lui et al. |
| 2013/0110696 | A1 | 5/2013 | Jacobs |
| 2013/0254089 | A1 * | 9/2013 | Kirby ..................... G06Q 40/06 |
| | | | 705/37 |
| 2014/0046716 | A1 | 2/2014 | Black et al. |
| 2014/0279398 | A1 | 9/2014 | Stewart et al. |
| 2014/0279500 | A1 * | 9/2014 | Larko .................. G06Q 30/016 |
| | | | 705/44 |
| 2015/0142622 | A1 | 5/2015 | Robertson |
| 2015/0339765 | A1 * | 11/2015 | Dubey .................... G06Q 40/00 |
| | | | 705/35 |
| 2015/0379644 | A1 | 12/2015 | Danielak |
| 2016/0072730 | A1 | 3/2016 | Jubran et al. |
| 2016/0104133 | A1 * | 4/2016 | Davis ..................... G06Q 20/10 |
| | | | 705/39 |
| 2016/0247228 | A1 | 8/2016 | Connolly et al. |
| 2016/0379076 | A1 * | 12/2016 | Nobuoka ............. G06K 9/6215 |
| | | | 382/103 |
| 2017/0070575 | A1 | 3/2017 | Royal et al. |
| 2017/0359230 | A1 | 12/2017 | Dintenfass et al. |
| 2018/0039990 | A1 * | 2/2018 | Lindemann ............ G06V 40/19 |
| 2018/0089688 | A1 * | 3/2018 | Kohli ................. G06Q 20/4016 |
| 2019/0058669 | A1 | 2/2019 | Duarte et al. |
| 2019/0073733 | A1 | 3/2019 | Steinhardt et al. |
| 2019/0132224 | A1 | 5/2019 | Verma et al. |

OTHER PUBLICATIONS

Leinonen et al.: "Optimizing Liquidity Usage and Settlement Speed in Payment Systems", dated Dec. 11, 1999, Located via:IP.Com Prior Art Database: Technical Literature Search, Download URL:https://pdfs.semanticscholar.org/92a0/8c1149f7068423e48afb4d3e712ff5a65a29.pdf.

U.S. Office Action relating to U.S. Appl. No. 16/294,001, dated Nov. 27, 2020.

USPTO, Final Office Action relating to U.S. Appl. No. 16/293,979 dated Jun. 15, 2020.

USPTO, U.S. Office Action relating to U.S. Appl. No. 16/293,979, dated Sep. 22, 2020.

* cited by examiner

FIG. 7

REAL-TIME TRANSFER MANAGEMENT INTERFACE

CROSS REFERENCE TO RELATED APPLICATIONS

The present application is a continuation-in-part of U.S. application number of U.S. application Ser. No. 16/427,882 filed May 31, 2019 which is a continuation-in-part of U.S. application Ser. No. 16/293,979 filed Mar. 6, 2019. The contents of the above-referenced applications are incorporated herein by reference.

TECHNICAL FIELD

The present disclosure relates to transfer management controls and systems and, more particularly, to systems and methods for remote management of electronic transfers.

BACKGROUND

Resources, such as computing resources including memory and processing power and other resources such as tokens or value stores, may sometimes be transferred at electronic systems. For example, Society for Worldwide Interbank Financial Telecommunication (SWIFT) provides a network which allows financial institutions to send and receive information about financial transactions. Most international interbank messages use the SWIFT network.

Numerous servers may sometimes be involved in processing a transfer of resources. For example, in some instances intermediary or correspondent banking servers may facilitate transactions. For example, an intermediary bank may be used when a transfer is being made between accounts associated with two banks that do not have a relationship with one another.

Furthermore, even internally at a particular bank, various servers may be engaged in order to process a transfer. Given the numerous computer systems that may be involved in processing a transfer, it can be difficult for a transferring party who configured a transfer to communicate with a system that is currently processing the transfer.

BRIEF DESCRIPTION OF THE DRAWINGS

Embodiments are described in detail below, with reference to the following drawings:

FIG. 7 is a further example display screen of an interface in accordance with an example embodiment;

Like reference numerals are used in the drawings to denote like elements and features.

DETAILED DESCRIPTION OF VARIOUS EMBODIMENTS

Figure 1:
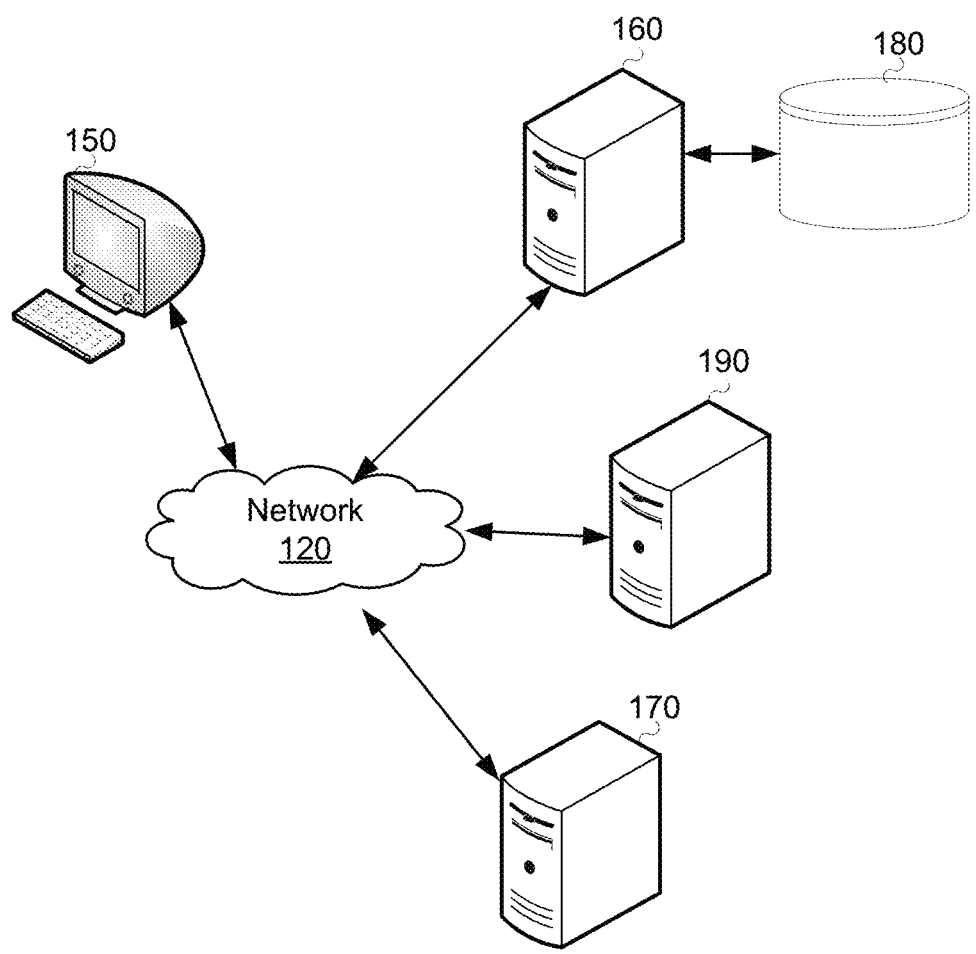
FIG. 1 is a schematic operation diagram illustrating an operating environment of an example embodiment.

Computer-based tools for managing transfers are described. More particularly, methods and computer systems, such as server computing systems, which provide transfer management tools are described.

In an aspect, the present application described a method. The method may include: receiving a message representing a request for a transfer; performing a series of automated processing operations on the message, the processing operations including at least a first processing operation and a second processing operation; while the series of automated processing operations are being performed: providing, to a client device associated with an authenticated entity, a transfer interface, the transfer interface including an interface element for selecting the transfer; receiving an indication of a selection of the transfer; in response to receiving the indication of the selection, retrieving stage state data, the stage state data indicating a current one of the automated processing operations in the series; and sending, to the client device, an indication of the stage state data, wherein the client device is configured to update the transfer interface in response to receiving the indication to display a representation of the series of automated processing operations which identifies one of the processing operations in the series as a current processing operation.

In some implementations, the first processing operation may be performed by: evaluating the message based on first defined criteria to determine whether the message passes the first processing operation or fails the first processing operation; when the message fails the first processing operation: sending a notification to an administrator device; and upon receiving a release command from the administrator device, determining that the message has passed the first processing operation; and when the message is determined to have passed the first processing operation: initiating the second processing operation for the message; and updating stage state data to reflect that the second processing operation has been initiated.

In some implementations, the second processing operation may be performed by: evaluating the message based on second defined criteria to determine whether the message passes the second processing operation or fails the second processing operation; when the message fails the second processing operation: repeatedly re-evaluating the message based on the second defined criteria until the message is determined to have passed the second processing operation; and when the message is determined to have passed the second processing operation: initiating a third processing operation for the message; and updating stage state data to reflect that the third processing operation has been initiated.

In some implementations, the message may be a free format message. At least one of the processing operations in the series may evaluate whether the message includes required data. The message may be determined to have failed that one of the processing operations when the message does not include the required data.

In some implementations at least one of the processing operations in the series compares data in the message to a blacklist. The message may be determined to have failed that one of the processing operations when the data in the message corresponds to an entry in the blacklist.

In some implementations, at least one of the processing operations in the series performs a resource check for a transferor associated with the message by querying a database to identify available resources for the transferor. The message may be determined to have failed that one of the processing operations when the transferor is determined to have insufficient resources.

In some implementations, the current processing operation in the transfer interface is selectable to input a processing command. The method may further include: receiving an indication of the processing command; and performing a processing operation associated with the message based on the processing command.

In some implementations, the method may further include: sending, to a third party server, a request for external processing data associated with the message; receiving, from the third party server, the external processing data associated with the message; and sending, to the client device, an external processing indication based on the external processing data, wherein the client device is configured to update the transfer interface based on the external processing indication.

In some implementations, the external processing data may indicate hop information for the message.

In some implementations, the hop information may indicate one or more of: a number of hops of a message, a fee at one or more of the hops, and an exchange rate applied at one or more of the hops.

In another aspect, there is described a server computer system. The server computer system includes a communications module, a processor coupled to the communications module and a memory storing processor-executable instructions which, when executed, configure the processor to perform a method described herein.

In a further aspect, there is provided a non-transitory computer readable storage medium including processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 (which may also be referred to as a server computer system) and a client device 150 communicate via a network 120. The client device 150 is a computing device that may be associated with an entity, such as a user or client, having resources associated with the server 160. For example, the server 160 may track, manage, maintain, and/or lend resources to the entity. The resources may, for example, be computing resources, such as memory or processor cycles. By way of further example, the resources may include stored value, such as fiat currency, which may be represented in a database. For example, the server 160 may be coupled to a database 180, which may be provided in secure storage. The secure storage may be provided internally within the server 160 or externally. The secure storage may, for example, be provided remotely from the server 160. For example, the secure storage may include one or more data centers. The data centers may, for example, store data with bank-grade security.

The database 180 may include records for a plurality of accounts and at least some of the records may define a quantity of resources. For example, the entity that is associated with the client device 150 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity.

The entity that is associated with the client device 150 and the account may be a customer of a financial institution which operates or manages the server 160. The financial institution may, for example, offer correspondent banking services to the entity. A correspondent bank is a bank that provides services on behalf of another financial institution. For example, the entity may be a financial institution that operates in a jurisdiction that is different than the jurisdiction in which the financial institution operates. By way of example, the financial institution may operate within Canada and the entity may be a financial institution that is foreign to Canada. For example, the entity may be a United States bank. The entity may rely upon the financial institution and, in particular, the server 160, for facilitating wire transfers, conducting transactions, accepting deposits, etc. within a country in which the entity does not operate directly. All such operations may be considered transfers.

The amount of credit that is available to the entity as reflected in the database 180 may be defined by the financial institution that operates the server 160. For example, the server 160 may communicate with an administrator device 170. The administrator device 170 is a computing device that may be operated by an administrator associated with the financial institution. The administrator may login to the server 160 and may then define a credit limit that is to be associated with the entity. The credit limit represents an amount of borrowed resources that the entity will be permitted to use. During the course of a day, the entity may use and obtain additional resources as transactions (both incoming and outgoing) are processed. At various points throughout the day, the owned resources for an entity may fall below zero and the entity may then begin to use borrowed resources.

Accordingly, the administrator device 170 may be used to vary administrator settings such as the total amount of borrowed resources that are available to the entity. An administrator may, for example, modify the credit limit in response to market conditions. For example, if a recent event suggests that the entity may have an inability to return borrowed resources, the administrator may reduce the amount of resources available for borrowing by using the administrator device 170 to configure the server 160 to reduce the amount of credit available.

The server 160 may, for example, process transfers that involve other financial institutions. For example, transfer messages may be received at the server 160 from a third party server 190. The third party server 190 may be a server associated with a SWIFT network, for example. The server 160 and the third party server 190 may communicate over a network, for example.

The client device 150, the server 160, the third party server 190 and the administrator device 170 may be in geographically disparate locations. Put differently, the client device 150 may be remote from the server 160 and the server 160 may be remote from the administrator device 170 and the third party server 190.

The client device 150, the server 160, the third party server 190 and the administrator device 170 are computer systems. The client device 150 and/or the administrator device 170 may take a variety of forms including, for example, a mobile communication device such as a smartphone, a tablet computer, a wearable computer such as a head-mounted display or smartwatch, a laptop or desktop computer, or a computing device of another type.

The client device 150 may communicate with the server 160 via the network 120 in order to manage the use of resources. For example, the client device 150 may access the server to access a graphical user interface for viewing resource status and/or for managing the user of resources.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
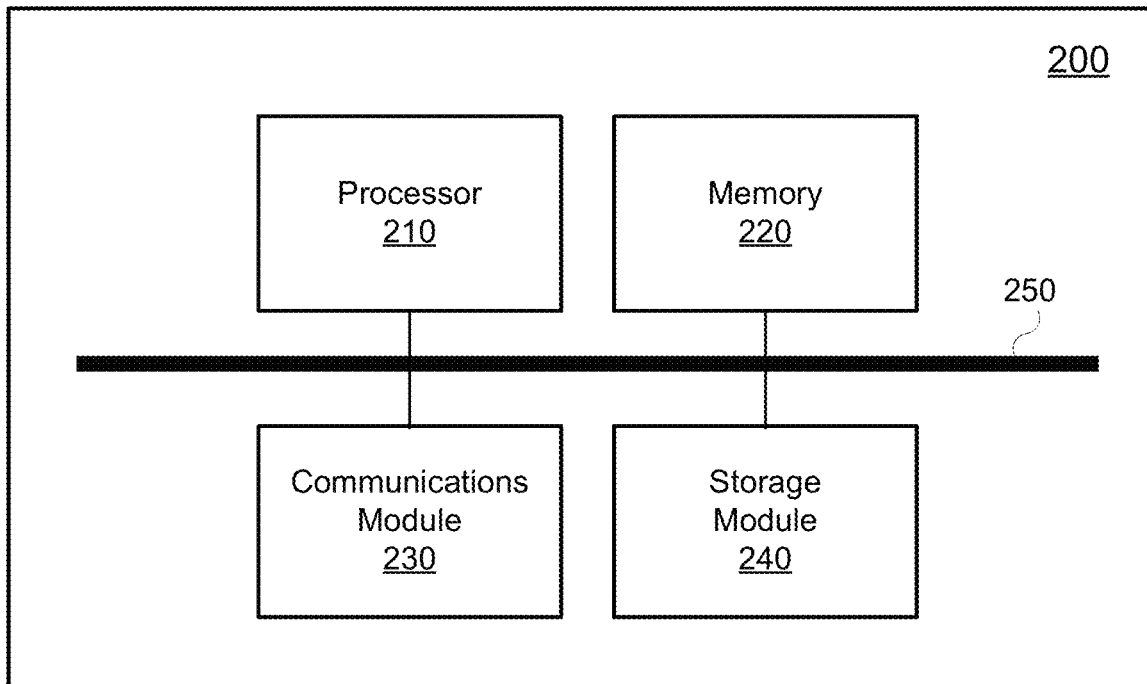
FIG. 2 is high-level schematic diagram of an example computing device.

The client device 150, the server 160 and the administrator device 170 are computing devices. Referring now to FIG. 2, a high-level operation diagram of an example computing device 200 will now be described. The example computing device 200 may be exemplary of the client device 150, the server 160 and/or the administrator device 170.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, INTEL™ x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via WI-FI™, using BLUETOOTH™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Where the example computing device 200 functions as the server 160 of FIG. 1, the storage module 240 may allow the example computing device 200 to access the secure data in the database 180.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the client device 150, the server 160, or the administrator device 170. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Furthermore, while a single network 120 is illustrated, in operation multiple networks may be utilized. For example, the client device may communicate with the server 160 over a first network, whereas the server 160 may communicate with the third party server over a second network, such as a SWIFT network.

Furthermore, the server 160 is a system which may be comprised of numerous computing devices that are communicatably connected to one other (e.g., over a network).

While not illustrated in FIG. 1, the server 160 may be in communication with other computer systems that may be engaged in processing or clearing a transfer.

Figure 3:
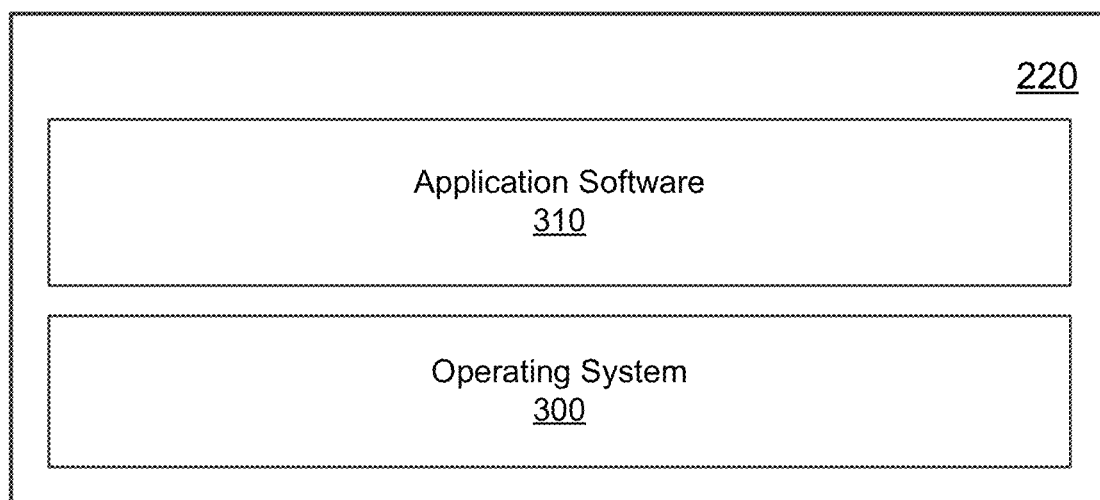
FIG. 3 shows a simplified organization of software components stored in a memory of the example computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, GOOGLE™ ANDROID™, APPLE™ IOS™, UNIX™, LINUX™, MICROSOFT™ WINDOWS™, APPLE™ OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the client device 150, the server 160 and/or the administrator device 170.

While a single application 310 is illustrated in FIG. 3, in operation the memory 220 may include more than one application 310 and different applications 310 may perform different operations.

Figure 4:
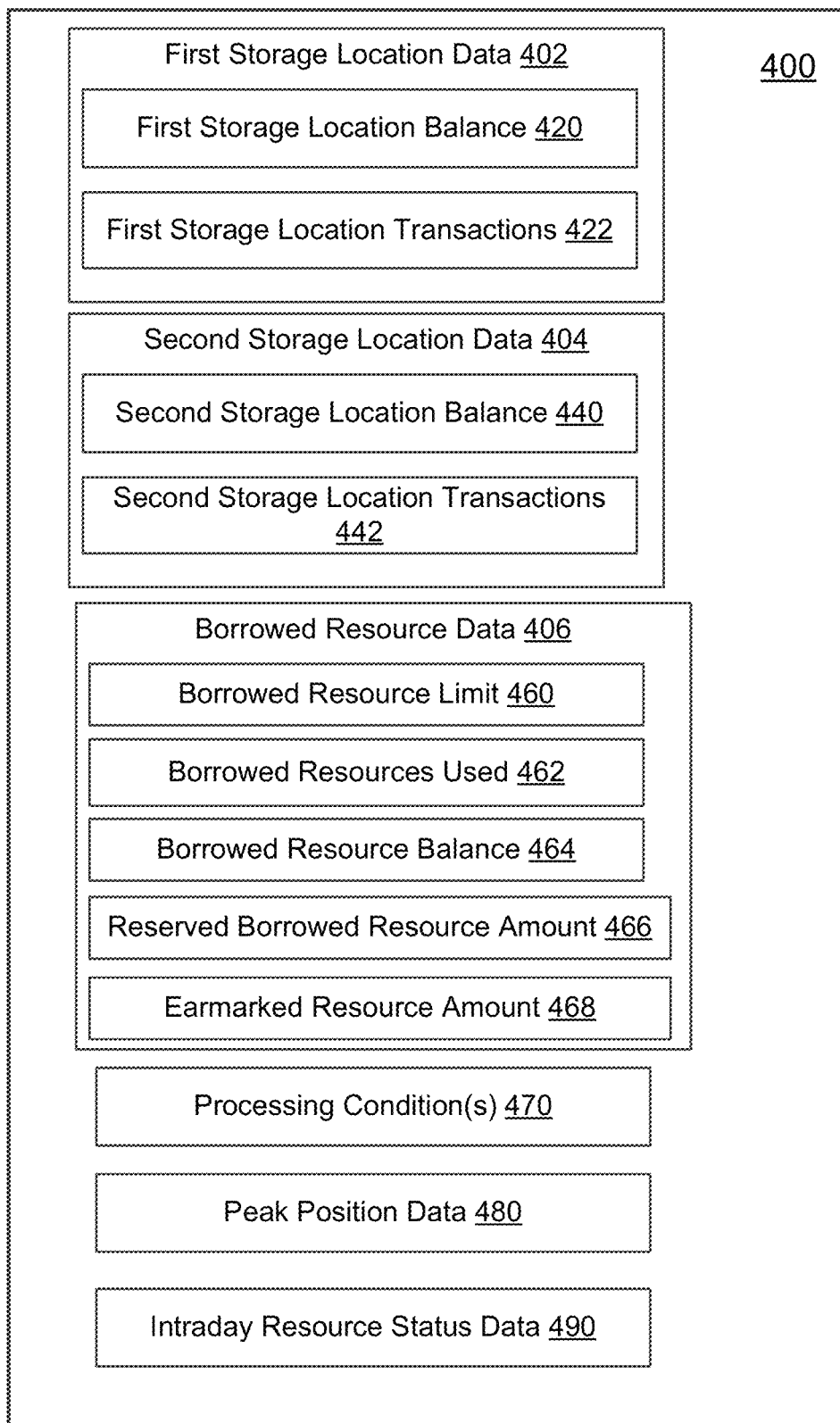
FIG. 4 is a block diagram of an example entity account record.

Reference will now be made to FIG. 4, which illustrates an example record 400 for an entity account. The entity account may, for example, be an account for a foreign financial institution. The record 400 may be stored in the database 180 (FIG. 1). The record 400 may be referred to, for example, as an entity record, an account record, or an entity account record.

The record 400 includes data associated with the entity. For example, the record 400 may include resource availability data. The resource availability data may include data representing resources owned by the entity and/or resources available for borrowing by the entity. The record 400 may include resource availability data for a plurality of storage locations. These storage locations, which may also be referred to as buckets or virtual stores, may represent individual bank accounts that are each associated with the entity. The example record 400 includes first storage location data 402 and second storage location data 404. The first storage location data 402 may represent a first bank account and the second storage location data 404 may represent a second bank account. The first storage location data 402 may include a first storage location balance 420 and first storage location transactions 422. The first storage location balance 420 may represent a current amount of resources stored in, represented by, or otherwise associated with the first storage locations. For example, the first storage location balance 420 may represent a current bank balance for the first storage location.

The first storage location transactions 422 may be a transaction listing for the first storage location. For example, the first storage location transactions 422 may identify completed (i.e., posted), pending (i.e., authorized transactions awaiting completion) and/or scheduled transactions that are associated with the first storage location. Transactions may represent the transfer of resources between records and may also be referred to as transfers. Accordingly, a transaction may also be referred to as a data transfer or an intraday transfer since the transactions may represent transfers for a particular day (e.g., the present day).

The first storage location transactions 422 may represent both incoming and outgoing transactions for the first storage location. Incoming transactions may be referred to as credits whereas outgoing transactions may be referred to as debits. Incoming transactions have an effect of increasing the availability of resources in the first storage location and outgoing transactions have the effect of decreasing the availability of resources in the first storage location. Incoming transactions, therefore, represent the receipt of additional resources, whereas outgoing transactions represent the removal of resources.

The second storage location data 404 also includes a balance (referred to as the second storage location balance 440) and transactions (referred to as the second storage location transactions 442). These are similar to the first storage location balance 420 and the first storage location transactions 422 except that the second storage location balance 440 and the second storage location transactions 442 refer to data associated with the second storage location.

The record 400 also includes borrowed resource data 406. The borrowed resource data includes data regarding borrowed resources. The borrowed resources are resources that are not owned by the entity associated with the record 400 but that are made available to that entity. For example, the borrowed resources may be resources that are owned by an operator of the server 160. The borrowed resource data 406 may include a borrowed resource limit 460. The borrowed resource limit 460 may indicate a threshold. The threshold may be, for example, a maximum amount of borrowed resources that are available to the entity. The threshold may, in at least some embodiments, be a credit limit such as a credit limit that is sometimes referred to as an undisclosed credit limit. The borrowed resource limit 460 may be controlled or configurable by the operator of the server 160 and/or by the server 160 itself. For example, the server 160 may be configured to automatically reduce the borrowed resource limit 460 in response to detecting the occurrence of one or more predetermined trigger conditions. By way of example, the server 160 may automatically monitor electronic media (such as news websites, social media, etc.) and may automatically reduce the borrowed resource limit 460 if a trigger condition occurs which would suggest that the entity may not be able to return any borrowed resources. For example, news articles suggesting that the entity has or is about to file for creditor protection or other relief may cause the server 160 to automatically reduce the borrowed resource limit 460. Alternatively or additionally, the server 160 may reduce (or increase) the borrowed resource limit 460 in response to receiving an instruction to do so from an authenticated administrator device 170.

The borrowed resource data 406 also includes data reflecting borrowed resources used 462. For example, such information may be a total amount of credit that has already been used by the entity.

The borrowed resource data 406 may include a reserved borrowed resource amount 466. The reserved borrowed resource amount 466 may be a quantity that is defined by the entity (e.g., through the client device) which represents an amount of borrowed resources that are not to be used. That is, the reserved borrowed resource amount 466 may represent an amount of resources that are to be set aside and not used (unless the reserved borrowed resource amount 466 is varied to release such resources). The reserved borrowed resource amount 466 may be defined by the client device 150 in response to user input and the reserved borrowed resource amount 466 may be defined for any one of a number of reasons. For example, the server 160 may be configured to dip into the borrowed resource limit 460 (i.e., to borrow resources) whenever insufficient resources are available in the various storage locations (e.g., when the first storage location balance 420 and/or the second storage location balance 440 fall to zero). When borrowed resources are used, however, the entity may be required to, in the future, not only replenish the borrowed resource that were used, but also to transfer a further amount of resources to an account associated with the server 160 (e.g., interest may be required). The entity may prefer to limit the amount of borrowed resources that are used in order to avoid having to transfer such additional resources to the account associated with the server 160 and may, instead, prefer that outgoing transfers be delayed until the storage location balance(s) 420, 440 rise above zero. Additionally or alternatively, the entity may prefer to reserve a portion of the borrowed resource limit 460 for emergencies.

The borrowed resource data 406 may include an earmarked resource amount 468. As will be described in greater detail below, various transactions may be earmarked and earmarking may reserve a portion of the borrowed resource limit 460. The earmarked resource amount 468 may reflect the total number of transactions that have been earmarked.

The borrowed resource data 406 may, alternatively or additionally, include a borrowed resource balance 464. The borrowed resource balance 464 is an amount of borrowed resources that have been made available to the entity that are not yet used. For example, the borrowed resource balance 464 may be the difference between the borrowed resource limit 460 and the current borrowed resources used 462. In at least some embodiments, the borrowed resource balance 464 may be further discounted for the reserved borrowed resource amount 466 and/or the earmarked resource amount 468. For example, in some embodiments, the borrowed resource balance 464 may be determined by subtracting the current borrowed resources used 462, the reserved borrowed resource amount 466 and/or the earmarked resource amount 468 from the borrowed resource limit 460.

While FIG. 4 illustrates the borrowed resource data 406 apart from the first storage location data 402 and the second storage location data 404, in some implementations, the borrowed resource data 406 may be associated with a particular storage location. For example, each storage location may have its own associated borrowed resources.

The record 400 may also include one or more processing conditions 470. Processing conditions may take a variety of forms. By way of example, the processing conditions 470 may include one or more of: a defer processing condition (which may cause processing of one or more associated transfers to be suspended until the defer is released/removed), a prioritization processing condition (which may cause one or more associated transfers to be processed with a higher (or lower as the case may be) relative priority than other transfers not so prioritized), an earmark processing condition (which may cause at least a portion of the borrowed resource limit 460 to be set aside for one or more specified transactions), or a processing condition of another type.

A given one of the processing conditions 470 may be associated with a particular transaction. That is, a processing condition 470 may be linked to particular transaction. The transaction may be an outgoing transaction which is scheduled and/or currently pending. In some implementations, one or more of the processing conditions 470 may be linked to multiple transactions. For example, a processing condition 470 may include transfer identification information for identifying affected intraday transfers and an action that is to be applied to the affected intraday transfers. That is, the processing condition 470 may define a rule that may be used by the server 160 to identify affected transactions. By way of example, the processing condition may include a threshold and an action and the threshold may be used to identify which of the transactions are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold.

Other transfer identification information that may be defined for a processing condition 470 and used to identify affected transfers may include, for example, a recipient name, a character string, a reference number, etc. By way of example, a processing condition 470 may specify that any transfers to a certain recipient are to be processed in accordance with a specific action. For example, such transfers may be automatically prioritized as high priority. By way of further example, such transfers may be automatically earmarked. By way of yet further example, such transfers may be automatically deferred.

The processing condition(s) 470 may be defined by the client device 150. That is, the server 160 may update, modify, remove or add a processing condition in response to user input received at the client device 150. Interfaces which facilitate input of processing conditions will be described in greater detail below.

The server 160 is configured to process transactions (i.e., intraday transfers) in accordance with the processing condition(s) 470. By way of example, prioritization may affect processing order such that "higher" priority transactions are processed ahead of "lower" priority transactions. In some implementations, the server 160 may apply special processing rules to transfers of a certain priority. For example, "high" priority transfers may be processed with a white-glove service level such that at every stage of processing, they are specially handled to ensure efficient processing. By way of further example, in some implementations, low priority transfers may not use borrowed resources for processing. Such transfers may only be processed when owned resources are available (e.g., available in the first or send storage locations).

For a defer processing condition, the server 160 may, for example, pause processing of any transaction that is deferred until that transaction is released (i.e., until the deferral is removed). For a transaction that is earmarked, the server 160 may process such a transaction using borrowed resources.

The record 400 may include intraday peak position data 480. The peak position data 480 may include peak credit position data and/or peak debit position data. For example, during the course of a day, the server 160 may automatically monitor inflows and outflows of resources for the account(s). During the day, resources may be received (i.e., credited) and resources may be sent (i.e., debited). The difference between the resources received and the resources sent throughout the day up until the current time is the current net position. When more resources have been received than sent, there is a credit position (indicating that the account balances are increasing) and when more resources have been sent than received, there is a net debit position (indicating that the account balances are decreasing). The peak position data 480 may indicate the maximum credit positions and maximum debit positions on an intraday basis. For example, the peak position data 480 may indicate the amount associated with each maximum and may also reflect a time associated with that maximum. The time may be the amount of time that the net position remained at the associated peak position. The peak position data 480 may include multiple peak credit and peak debit positions. For example, the top five credit positions and the top five debit positions may be stored.

The record 400 may include other data which may generally be referred to as intraday resource status data 490. The intraday resource status data 490 may include historical data representing point in time data throughout the day. That is, the intraday resource status data 490 may indicate various balances or levels of resources at various times throughout the day. The intraday resource status data 490 may, for example, be used by the server 160 when preparing a user interface that includes a resource usage graph, which will be explained in greater detail below.

The record 400 may include more or less data than that illustrated in FIG. 4 and the record 400 may be organized or grouped differently than what is illustrated in FIG. 4. For example, historical transaction data may be separated from upcoming or scheduled transaction data.

Figure 5:
FIG. 5 is a flowchart of an example method in accordance with an example embodiment of the present disclosure.

Operations performed by the client device 150 and the server 160 will be described below with reference to FIGS. 5-10. Referring first to FIG. 5, a flowchart showing example operations is illustrated.

FIG. 5 is a flowchart showing operations performed by a server 160. The operations may be included in a method 500 which may be performed by the server 160. For example, computer-executable instructions stored in memory of the server 160 may, when executed by a processor of the server 160, configure the server 160 to perform the method 500 or a portion thereof.

At operation 501, the server 160 authenticates an entity. For example, the server 160 receives authentication credentials from the client device 150 via a communications module. The authentication credentials may, for example, include one or more of: a username, a password, a personal identification number (PIN), biometric data such as a representation of a fingerprint, or other data that may be used to verify the identity of an operator of the client device 150. The server 160 identifies an account to which the authentication credentials correspond and determines that the authentication credentials are valid before proceeding to subsequent operations 502 to 512 of the method 500. If, instead, the server 160 determines that the authentication credentials are invalid, an error message may be returned to the client device 150 and/or a security action may be taken (such as locking an account after a predetermined number of invalid login attempts).

After the entity has validly authenticated itself with the server 160 at operation 501, the entity may be considered to be an "authenticated entity". The server 160 may then, at operation 502, provide a user interface to the client device 150 via the communications module. For example, the server 160 may provide, via the communications module and to the client device associated with the authenticated entity, an intraday resource availability interface.

Figure 6:
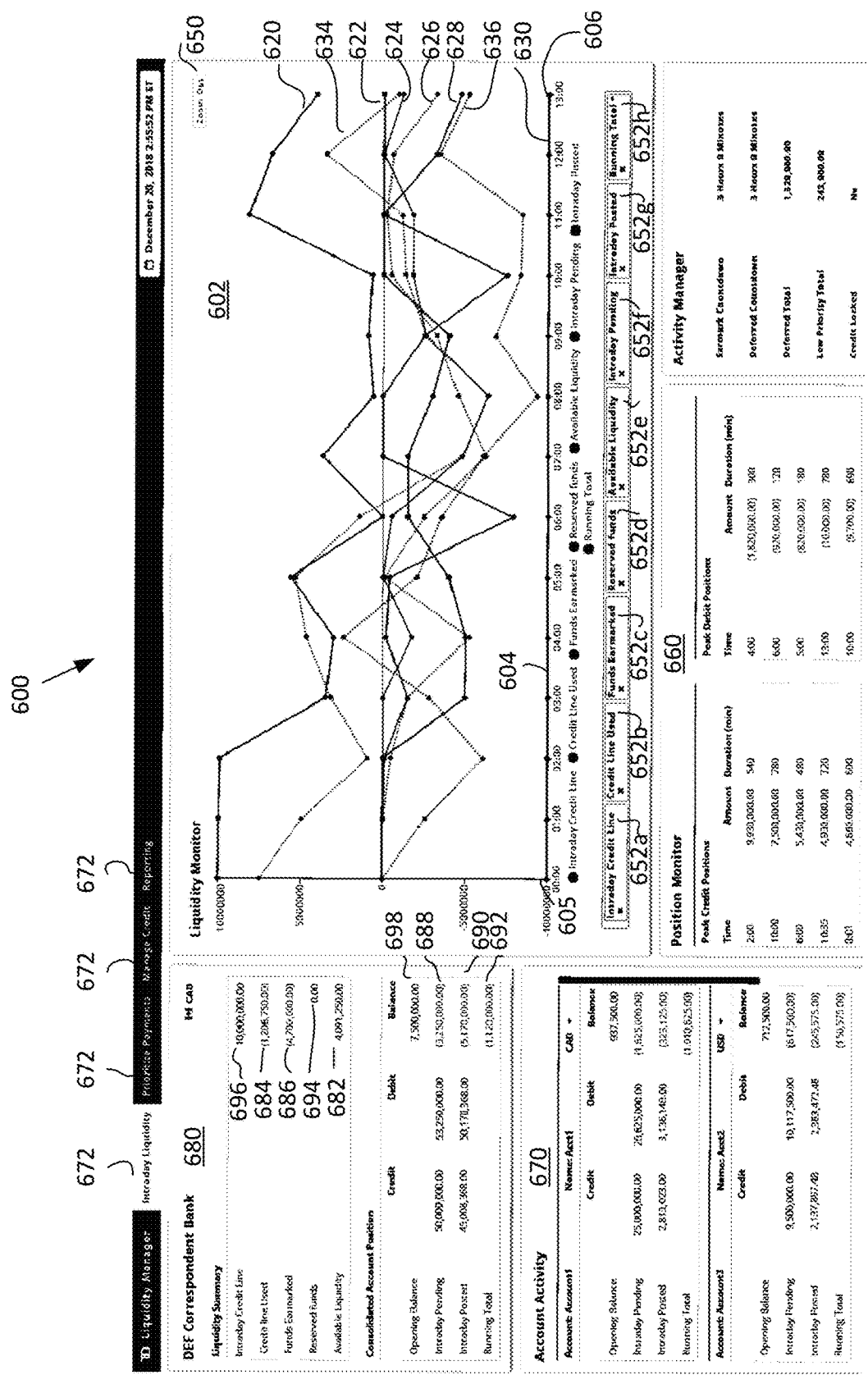
FIG. 6 is an example display screen of an interface in accordance with an example embodiment.

An example intraday resource availability interface 600 is illustrated in FIG. 6. The example resource availability interface 600 includes a resource usage graph 602 for one or more account associated with the authenticated entity. The resource usage graph 602 has a time axis 604 that includes a time period that includes a day start time 605 and a current time 606. In the example illustrated, the time axis 604 is the x-axis and a resource quantum (which may be in units of resources, such as dollars) is the y-axis. The resource usage graph is an intraday graph, illustrating the change in resources over the course of a day.

The resource usage graph 602 includes one or more indicators which, in the example, are in the form of lines. The indicators may include a resource availability indicator 620. The resource availability indicator 620 may be a measure of the total amount of resources available at an associated time. That is, the resource availability indicator indicates a total amount of resources over the time period. The value of the resource availability indicator 620 at any given point represents the quantity of resources available at the time represented by that point. The resource availability indicator may, in at least some implementations, be referred to as the available liquidity.

The resource availability indicator 620 indicates the total amount of resources over the time period, including borrowed resources, which are available for use in association with the one or more account that is associated with the entity. For example, the resource availability indicator may include borrowed resources that are not yet used, reserved, or earmarked (i.e., the borrowed resource balance 464 (FIG. 4)). The resource availability indicator 620 may also be based on the total account balances for all resource storage locations associated with the entity. For example, it may be based on the first and second storage location balances 420, 440 and also based on the borrowed resource balance 464.

Accordingly, the resource availability indicator 620 may reflect both owned and borrowed resources that are available for use by the entity in fulfilling outgoing transfers. A location on the resource availability indicator 620 indicates the total amount of resource available at a respective time of the day.

The resource usage graph 602 may include other indicators instead of or in addition to the resource availability indicator 620. For example, the resource usage graph 602 may include a reserved resource indicator 622. The reserved resource indicator 622 indicates the total quantity of resources that have been marked as reserved throughout the day. That is, it may indicate the reserved borrowed resource amount 466 (FIG. 4.). When more resources are reserved, the reserved resource indicator increases whereas when fewer resources are reserved, the reserved resource indicator decreases.

The resource usage graph 602 may include a borrowed resources used indicator 624 which indicates the total quantity of borrowed resources that have been used throughout the day. The current value of the borrowed resources used indicator 624 may correspond to the current borrowed resources used 462 (FIG. 4) and prior values may indicate the borrowed resources used at other times of the day. As more borrowed resources are used, the borrowed resources used indicator 624 increases while, as less borrowed resources are used, the borrowed resources used indicator 624 decreases.

The resource usage graph 602 may include an intraday pending resource transfer indicator 626. The intraday pending resource transfer indicator 626 indicates the net pending resource transfers throughout the day. The net pending resource transfers are based on both incoming transfers and outgoing transfers. The incoming transfers may be referred to as credits whereas the outgoing transfers may be referred to as debits. When the incoming pending resource transfers exceed the outgoing pending resource transfers, the intraday pending resource transfer indicator 626 is positive while it becomes negative when the outgoing pending resource transfers exceed the incoming pending resource transfers. In at least some embodiments, the pending resource transfers may also be reflected in the resource availability indicator 620. That is, the resource availability indicator 620 may be based, in part, on the pending resource transfers.

The resource usage graph 602 may include an earmarked resource indicator 628 which indicates the total amount of resources that have been earmarked at any time during the day.

The resource usage graph 602 may include a borrowed resource limit indicator 630. The borrowed resource limit indicator 630 indicates the total borrowed resource limit throughout the day (i.e., it indicates a borrowed resource threshold, which may be an "undisclosed" credit limit, where "undisclosed" refers to the fact that such a credit limit is not typically disclosed to the entity although the intraday resource availability interface 600 provides disclosure of such a credit limit). In the illustrated example, the total borrowed resource limit did not change at any time during the day (e.g., it remained at 10,000,000.00 throughout the course of the day). However, the total borrowed resource limit could be modified by the administrator device 170.

The resource usage graph 602 may include a running total resource indicator 634. The running total resource indicator 634 may represent the total owned resources (e.g., in the first and second storage locations) when the intraday pending and intraday posted transfers are taken into account. For example, the running total resource indicator 634 may be calculated by adjusting an opening balance for any prior pending or posted transfers during the day. The running total resource indicator 634 begins the day at a level that corresponds to the opening balance and is then adjusted as transactions become pending and posted throughout the day.

The resource usage graph 602 may include an intraday posted resource transfer indicator 636. The intraday posted resource transfer indicator 636 indicates the net posted resource transfers throughout the day. The net posted resource transfers are based on both incoming transfers and outgoing transfers. The incoming transfers may be referred to as credits whereas the outgoing transfers may be referred to as debits. When the incoming posted resource transfers exceed the outgoing posted resource transfers, the intraday posted resource transfer indicator 636 is positive while it becomes negative when the outgoing posted resource transfers exceed the incoming posted resource transfers. In at least some embodiments, the posted resource transfers may also be reflected in the resource availability indicator 620. That is, the resource availability indicator 620 may be based, in part, on the posted resource transfers.

The resource usage graph 602 is a dynamic graph. Notably, the use of computer systems that communicate over a network allow the resource usage graph 602 to be updated in real-time. As the server 160 processes transfers throughout the day, the resource usage graph 602 maintains fresh data. The freshness of the data may allow the entity to input instructions to the server 160 through the intraday resource availability interface 600 based on the current resources. As will be understood following the discussion below, the intraday resource availability interface 600 acts as a man-machine interface to allow the client device 150 to send instructions or commands to the server 160 to vary the server's behaviour based on up-to-date data. Notably, by providing fresh data on the intraday resource availability interface 600, such instructions can be input while they remain valid (since the server 160 continues to process transactions while the intraday resource availability interface 600 is displayed). Further, through the use of computer systems, the intraday resource availability interface 600 may be fresh even though there may be numerous transactions being processed at a time and even though there may be a large geographic separation between the server 160 and the client device 150.

The intraday resource availability interface 600 may include other display features. For example, the intraday resource availability interface 600 may include a current resource availability summary 680. The current resource availability summary 680 may be displayed together with the resource usage graph 602 (i.e., on a common display screen). The current resource availability summary 680 displays current resource indicators including, for example, a current available resource indicator 682 which displays a current resource availability amount. The current available resources indicator 682 indicates a current amount of available resources, both owned and available for borrowing. The current available resource indicator 682 may correspond to the level of the resource availability indicator 620 at the current time.

The current resource availability summary 680 may include other current resource indicators. For example, a current borrowed resources used indicator 684 may indicate a current level of borrowed resources used. The current level of borrowed resources used may, for example, correspond to level of the level of the borrowed resources used indicator 624 at the current time. In the example, the current level of borrowed resources used indicator 684 indicates a negative number. In the example, a negative number is used to indicate that borrowed resources are currently being used. However, the number may instead by a positive number. A positive current level of borrowed resources used may occur when there are unused owned resources. Accordingly, the borrowed resources used indicator 684 may also reflect owned resources in at least some embodiments.

A current earmarked resources indicator 686 may display the current total amount of resources that have been earmarked. The current earmarked resources indicator 686 may correspond to the level of the earmarked resources indicator 628 at the current time. A current intraday pending resource transfer indicator 688 may display the current total amount of pending resource transfers for the day up until the current time. In the example, the current intraday pending resource transfer indicator 688 displays both the current pending credits and the current pending debits and displays a total which is based on the pending credits and debits. The current intraday pending resource transfer indicator 688 may correspond to the level of the intraday pending resource transfer indicator 626 at the current time.

A current intraday posted resource transfer indicator 690 may display the current total amount of posted resource transfers for the day up until the current time. In the example, the current intraday posted resource transfer indicator 690 displays both the current posted credits and the current posted debits and displays a total which is based on the posted credits and debits. The current intraday posted resource transfer indicator 688 may correspond to the level of the intraday posted resource transfer indicator 636 at the current time.

A current running total resource indicator 692 may be used to display a current total of owned resources which accounts for both the current intraday pending and intraday posted transfers. For example, the current running total resource indicator 692 may be calculated by adjusting an opening balance for any prior pending or posted transfers during the day. The current running total resource indicator 692 may correspond to the level of the running total resource indicator 634 at the current time. In the illustrated example, the current running total resources indicator 692 indicates a negative number, which indicates that borrowed resources are currently being used since all owned resources have been used.

A current reserved resources indicator 694 may display the current total amount of resources that have been reserved. The current reserved resources indicator 694 may correspond to the level of the reserved resources indicator 622 at the current time.

A current borrowed resource limit indicator 696 may indicate a current borrowed resource threshold. As noted previously, this threshold may be a limit that is defined by the entity operating the server 160. This represents the total amount of resources that the entity is making available to the entity that is associated with the entity account represented by the intraday resource availability interface 600.

In the example intraday resource availability interface 600 of FIG. 6, the current resource availability summary 680 is displayed together with an opening owned resource indicator 698. The opening owned resource indicator 698 indicates the level of resources at the start of the day (i.e., an opening balance of resources) and it may be used, for example, in determining the current running total resource indicator 692. A positive opening balance indicates that, at the start of the day, at least some owned resources were available and a negative opening balance may indicate that all owned resources were used and at least some borrowed resources were in use.

The indicators described above (both those in the resource usage graph 602 and those in the current resource availability summary 680) may be cumulative indicators for all storage locations for the entity that is associated with the intraday resource availability interface 600 being displayed. For example, they may account for resources associated with all storage locations in the entity account record 400 including, for example, a first storage location and a second storage location.

The intraday resource availability interface 600 may also include other indicators. For example, one or more indicators may be provided in a storage location-based summary 670. The storage location-based summary includes similar features as the current resources availability summary 680 but the storage location-based summary 670 displays data on a per-storage location basis rather than as aggregate totals across all storage locations.

The intraday resource availability interface 600 may include a widget configured to accept input to modify a parameter affecting the resource usage graph. Example widgets include a toggle widget 652a, 652b, 652c, 652d, 652e, 652f, 652g, 652h which may be configured to toggle the display of an associated indicator. For example, when a particular indicator is displayed on the resource usage graph, the associated toggle widget may be selected to supress display of that indicator. For example, a borrowed resource limit toggle widget 652a may be used to selectively display or supress display of the borrowed resource limit indicator 630. A borrowed resources used toggle widget 652b may be used to selectively display or supress display of the borrowed resources used indicator 624. An earmarked resources toggle widget 652c may be used to selectively display or supress display of the earmarked resources indicator 628. A reserved resources toggle widget 652d may be used to selectively display or supress display of the reserved resource indicator 622. A resource availability toggle widget 652e may be used to selectively display or supress display of the resource availability indicator 620. An intraday pending resource transfer toggle widget 652f may be used to selectively display or supress display of the intraday pending resource transfer indicator 626. An intraday posted transaction toggle widget 652g may be used to selectively display or supress display of the intraday posted transaction indicator 636. A running total resource toggle widget 652h may be used to selectively display or supress display of the running total resource indicator 634.

Conveniently, the toggle widgets may be useful, for example, to address problems that are inherent to computer displays. For example, such displays have limited screen area and expansion of screen area may be limited due, for example, to hardware limitations such as the availability of display ports on the client device 150. The toggle widget allows the same resource usage graph to be used to take different forms and allow for instant updating of the resource usage graph. For example, in at least some embodiments, activation of one of the widgets, such as one of the toggle widgets, causes the client device 150 to send a message to the server 160 requesting modification of the resource usage graph. The server 160 may prepare a modified resource usage graph based on the request and send it back to the client device 150 for display thereon. In other embodiments, the client device 150 may modify the resource usage graph in response to activation of the widget without further communicating with the server 160.

Another example of a widget may be a zoom widget 650 which is configured to accept input to modify a displayed time period associated with the resource usage graph. For example, the zoom widget 650 may allow for zooming in or out of the resource usage graph.

The intraday resource availability interface 600 may also include a position monitor 660. The position monitor 660 is configured to identify intraday peak position data 480. As noted previously, peak position data 480 may include peak credit position data and/or peak debit position data. That is, the position monitor 660 may identify the one or more top peak net credit and/or net debit positions. In the example, illustrated, the top five peak net credit and top five peak net debit positions are identified. For each peak position, an associated time is indicated. The time is the time when the peak position occurred. An amount associated with the peak position is also identified, together with a duration. The duration represents a duration of the peak (i.e., a length of time).

The intraday resource availability interface 600 may be a multi-screen interface in which at least some functionality is provided on display screens apart from the example display screen of FIG. 6. For example, the intraday resource availability interface 600 may include selectable interface elements 672 for toggling between various display screens provided by the resource availability interface 600 and each such screen may include a subset of features provided by the intraday resource availability interface 600. For example, selection of one of the selectable interface elements 672 may cause a resource prioritization screen to be displayed. An example resource prioritization screen is illustrated in FIG. 7.

The example resource prioritization screen provides particulars of a number of transfers, all of which are intraday transfers. For example, the resources prioritization screen may specify, for a given transfer, a reference number, a unique end-to-end transaction reference (UETR) which may act as a tracking number for cross border transfers, a quantity of resources, a unit indicator indicating the units of measurement of the resources (which is CAD or USD in the example), a status indicator, a recipient identifier, a sending identifier, and/or a priority status indicator.

Figure 7:
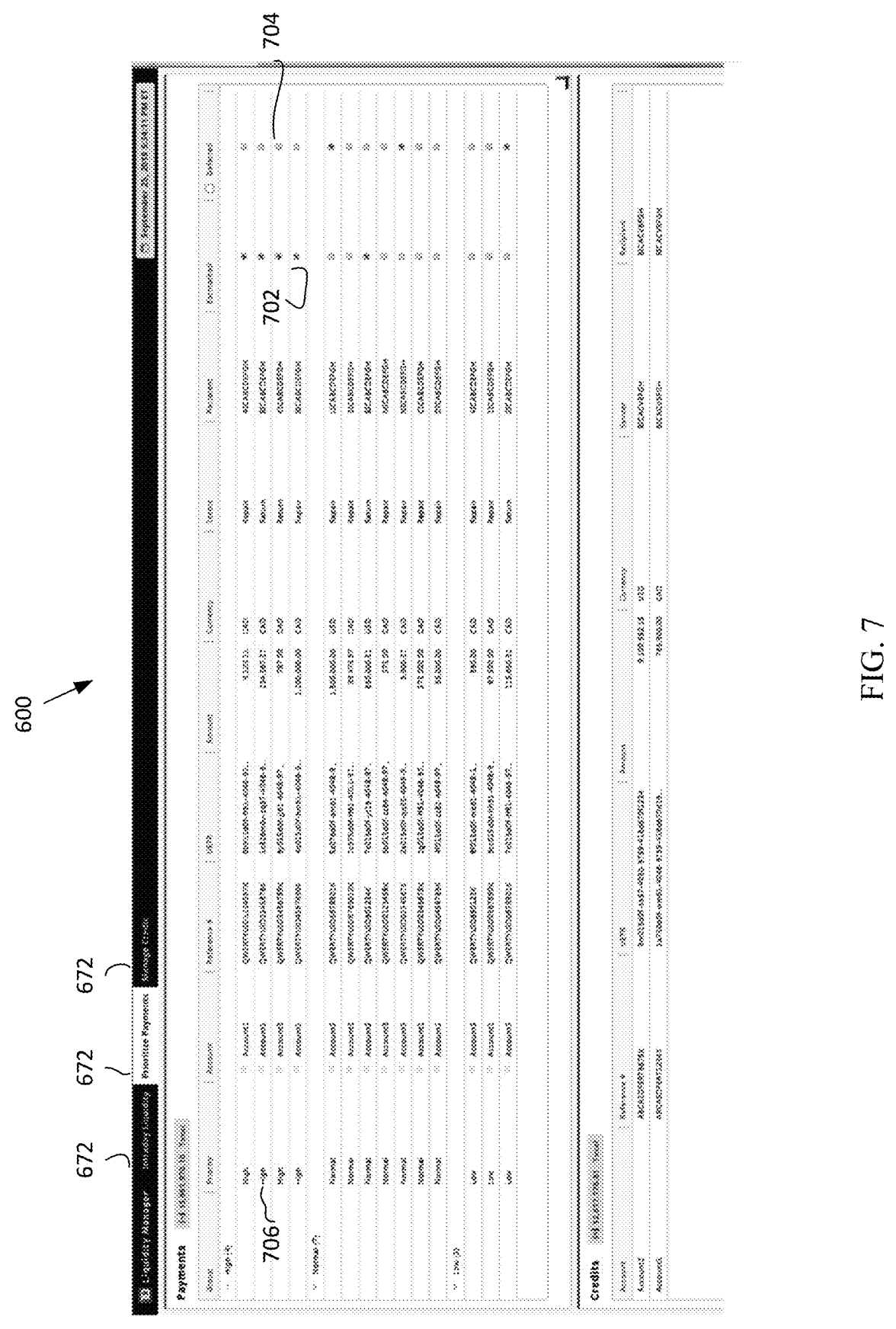

As illustrated in FIG. 7, the example screen of the intraday resource availability interface 600 may include a widget configured to accept input to modify a parameter, such as a parameter affecting the resource usage graph. The widget may, for example, be configured to receive a command that defines a processing condition that is to be applied for processing one or more of the transfers.

By way of example, an earmark widget 702 may be configured to accept input to reserve a portion of the borrowed resources for a particular transfer. The earmark widget 702 may, for example, be used to input an earmark command for a particular transfer. An earmark command may be used to configure the server 160 to reserve at least a portion of a borrowed resource balance (i.e., a portion that corresponds to the quantity of resources of the particular transfer) for the particular transfer. In the example, the earmark widget 702 may also be used to remove an earmark i.e., to input a command that causes the server 160 to remove the reservation of the portion of the borrowed resource balance for the particular transfer. In the example, the earmark widget 702 is a checkbox, but the earmark widget 702 may take other forms.

The example resource prioritization screen of FIG. 7 includes a defer widget 704. The defer widget 704 may be used to input a defer command for a transfer. The defer command is a processing condition that causes the associated transfer to be suspended so that it is not processed by the server 160 to complete the transfer until after the deferral is subsequently released. In the example, illustrated, the defer widget 704 also serves as a release widget which may be used to input a condition to remove a deferral of the transfer such that processing of that transfer resumes. That is, the release widget provides a selectable option to remove a processing condition. For example, the release widget may provide a selectable option to input a release command that removes a suspension previously applied to a transfer. In the example illustrated, the defer widget/release widget is a checkbox, but it may take other forms.

The example resource prioritization screen of FIG. 7 includes a prioritization widget 706. The prioritization widget 706 may be used to input a prioritization command. A prioritization command is associated with a processing condition that specifies a processing priority of at least one of the plurality of intraday transfers. The server 160, upon receiving such a command, configures processing of the associated transfer(s) according to the specified processing priority. Higher priority transfers are processed before lower priority transfers. In the example illustrated, the priority of a given transfer may be modified through a drag and drop gesture which selects a particular transfer, drags and drops it on a desired priority level. Other types of prioritization widgets 706 may, however, be used.

Figure 8:
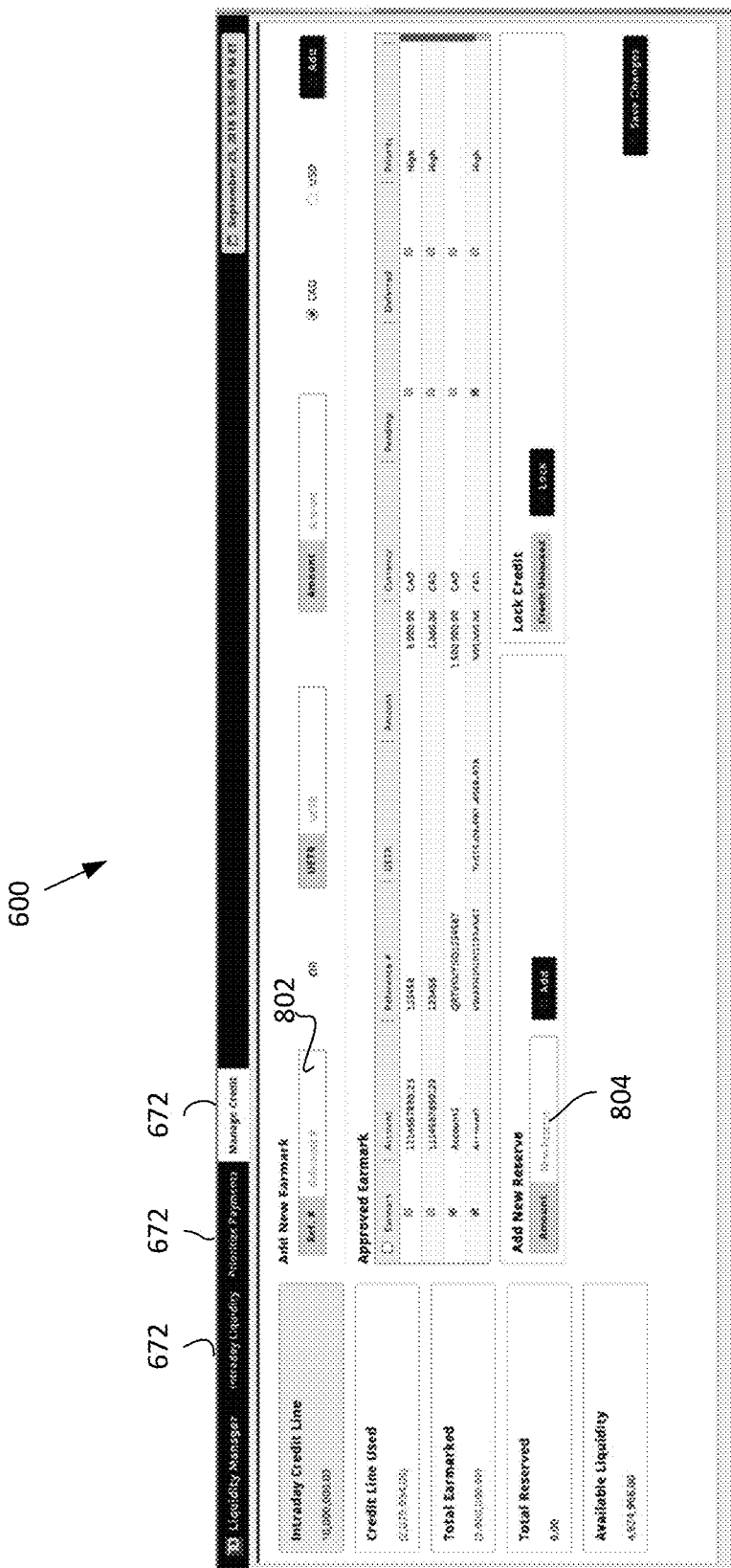
FIG. 8 is a further example display screen of an interface in accordance with an example embodiment.

A further example display screen of the intraday resource availability interface 600 is illustrated in FIG. 8. The display screen of FIG. 8 may be displayed in response to selection of an associated one of the selectable interface elements 672.

The example display screen of FIG. 8 is a borrowed resource management interface which includes particular functionality for managing the use of borrowed resources. For example, the example display screen includes a further earmark widget 802 that is configured to accept input to reserve a portion of the borrowed resources for a particular transfer. The example earmark widget 802 of FIG. 8 includes a textbox which allows for input of an identifier associated with a transfer, such as a unique identifier, UETR and/or an amount associated with the transfer. A listing of transfers that have previously earmarked is also listed and identifying data for such transfers is listed. Much like in the example of FIG. 7, the example display screen of FIG. 8 includes its own earmark widget and deferral widget to affect the listed transfers.

The example display screen of FIG. 8 includes a reserve resources widget 804. The reserve resources widget 804 may be used to input a command to the server 160 to set aside a particular amount of borrowed resources that are not to be used. That is, the reserve resources widget 804 may be used to input an instruction to the server to configure the server to modify a reserved borrowed resource amount 466 (FIG. 4).

The intraday resource availability interface 600 may include other features apart from those described above. For example, the intraday resource availability interface 600 may include one or more widgets for defining a processing condition 470 of the type described above with reference to FIG. 4; i.e., one that is to apply to any one or more transfer(s) that satisfy certain criteria. By way of example, a widget may allow for input of transfer identification information for identifying affected intraday transfers and an action that is to be applied to the affected intraday transfers. The processing condition 470 may include a threshold and an action and the threshold may be used to identify which of the transfers are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold.

By way of further example, a sharing widget may be configured to receive input to send at least some data represented on the intraday resource availability interface to another computer system, such as another client device. In response to receiving input through the sharing widget, the server 160 may automatically send a message to the other computer system. The message may include data represented on the intraday resource availability interface. For example, a user may wish to send data associated with the position monitor 660 to another computer system since such data may be useful for certain reporting requirements. The sharing widget may facilitate such an operation.

The intraday resource availability interface 600 of FIGS. 6 to 8 may also be referred to as an intraday transfer interface or an intraday transfer management interface since display screens provided by the interface may, as illustrated in FIGS. 7 and 8, identify specific transfers and provide functions for managing such transfers.

Referring again to FIG. 5, in providing the intraday resource availability interface 600 at operation 502, the server 160 may obtain data necessary to generate the interface. The data may, for example, be obtained from the entity account record 400. For example, the intraday resource status data 490 may be obtained. The server 160 may calculate or otherwise determine other data that is necessary to generate the interface and the server 160 may update the entity account record 400 to include certain data that is determined at operation 502 that is not yet stored in the entity account record 400.

At operation 504, the server 160 may detect a transfer of value associated with one or more account associated with the authenticated entity. The one or more account may, for example, represent storage locations. That is, the server 160 may detect a transfer of resources into or from one or more of the storage locations (such as the first storage location that is associated with the first storage location data 402 or the second storage location that is associated with the second storage location data 404). The transfer may be an incoming transfer or an outgoing transfer.

At operation 506, the server determines an updated available resource amount based on the detected transfer of value. That is, the transfer is one that affects the amount of available resources and so the available resource amount is updated to account for the transfer. If the transfer is an incoming transfer, the available resource amount increases while, if the transfer is an outgoing transfer, the available resource amount decreases. The update at operation 506 may include adjusting a prior available resource amount based on an amount associated with the detected transfer.

At operation 508, the server 160 sends, via the communications module and to the client device, an updated resource availability interface. The updated resource availability interface may, for example, be similar to the resource availability interface 600 of FIG. 6 but it may be updated based on the transfer. For example, the updated resource availability interface may be updated to include or reflect the updated available resource amount. The resource availability indicator 620 may be updated to include or reflect the updated available resource amount (and upon such updating may be referred to as an updated resource availability indicator). Other indicators may also be updated to account for the transfer. For example, any one or a combination of the following may be updated: current borrowed resources used indicator 684, current earmarked resources indicator 686, current available resource indicator 682, current intraday pending resource transfer indicator 688, current intraday posted resource transfer indicator 690, current running total resource indicator 692, running total resource indicator 634, reserved resource indicator 622, borrowed resources used indicator 624, intraday pending transfer indicator 626, the earmarked resource indicator 628, and/or any one or more indicators of the storage location-based summary 670.

At operation 510, the server 160 may receive input via a widget provided on the updated resource availability interface. Such input may be received at the server 160 via the communications module. That is, the server 160 may receive, via the communications module and from the client device, a signal representing a command. The command may be a command or operation of a type referenced with respect to a widget described above and the server 160 may, in response to receiving the command, perform an associated action and/or, at operation 512, update the resource availability interface 600 based on the input.

By way of example, the widget used to input the command may be a reserve resources widget 804 and the command may be a command to set aside a particular amount of borrowed resources that are not to be used. That is, the reserve resources widget 804 may be configured to accept input to reserve a portion of the borrowed resources and the server 160 may, at operation 510, receive, via the communications module and from the client device, a command to reserve a portion of the borrowed resources. The command may be sent from the client device to the server computer system responsive to input received through the widget. Then, in response to receiving the command, the server 160 may update the available resource amount. That is, the server 160 may determine a further updated available resource amount based on the reserved portion of the borrowed resources specified in the command. Then, at operation 512, the server 160 may send, via the communications module and to the client device, a further updated resource availability interface. The further updated resource availability interface is similar to the resource availability interface 600 of FIG. 6 but it has been updated to include a further updated resource availability indicator based on the further updated available resource amount. That is, the resource availability indicator 620 may be updated to, for example, add a further data point reflecting the available resources after the reserved amount is taken into account. Other affected indicators may also be updated including, for example, the current available resource indicator 682. Notably, the updating may be made in real time or near real time despite the fact that the client device is remote from the server and the fact that numerous indicators may be affected. The computing systems (e.g., the server and client device) make possible such features.

The input received at operation 510 may be input that is received through a widget of another type and the updating of the resource availability interface 600 may be based on the nature of the widget. For example, when the input was received through a toggle widget 652a, 652b, 652c, 652d, 652*e*, 652*f*, 652*g*, 652*h*, then the resource usage graph 602 may be updated to toggle display of the associated indicator. For example, the resource usage graph 602 may be updated to supress display of the resource availability indicator.

By way of further example, when the input is received through a zoom widget 650, the resource usage graph 602 may be modified to change a displayed time period associated with the resource usage graph. For example, where the command is a request to zoom in, the time period may be limited from the currently displayed time period and when the command is a request to zoom out, the time period may be expanded from the currently displayed time period.

By way of further example, when the input is received through an earmark widget 702, 802, then the resource usage graph 602 may be updated to modify one or more of the indicators that take earmarked resources into consideration including, for example, the earmarked resource indicator 628, the current earmarked resources indicator 686, the resource availability indicator 620 and/or the current available resource indicator 682 (which may also be referred to as a current resource availability indicator).

Responsive to receiving input through a widget, the server 160 may also update associated data in the record 400 (FIG. 4).

Accordingly, the server 160 and the client device 150 may cooperate to provide a dynamic display. The display is dynamic in that it is constantly being updated to ensure it displays fresh data.

Figure 9:
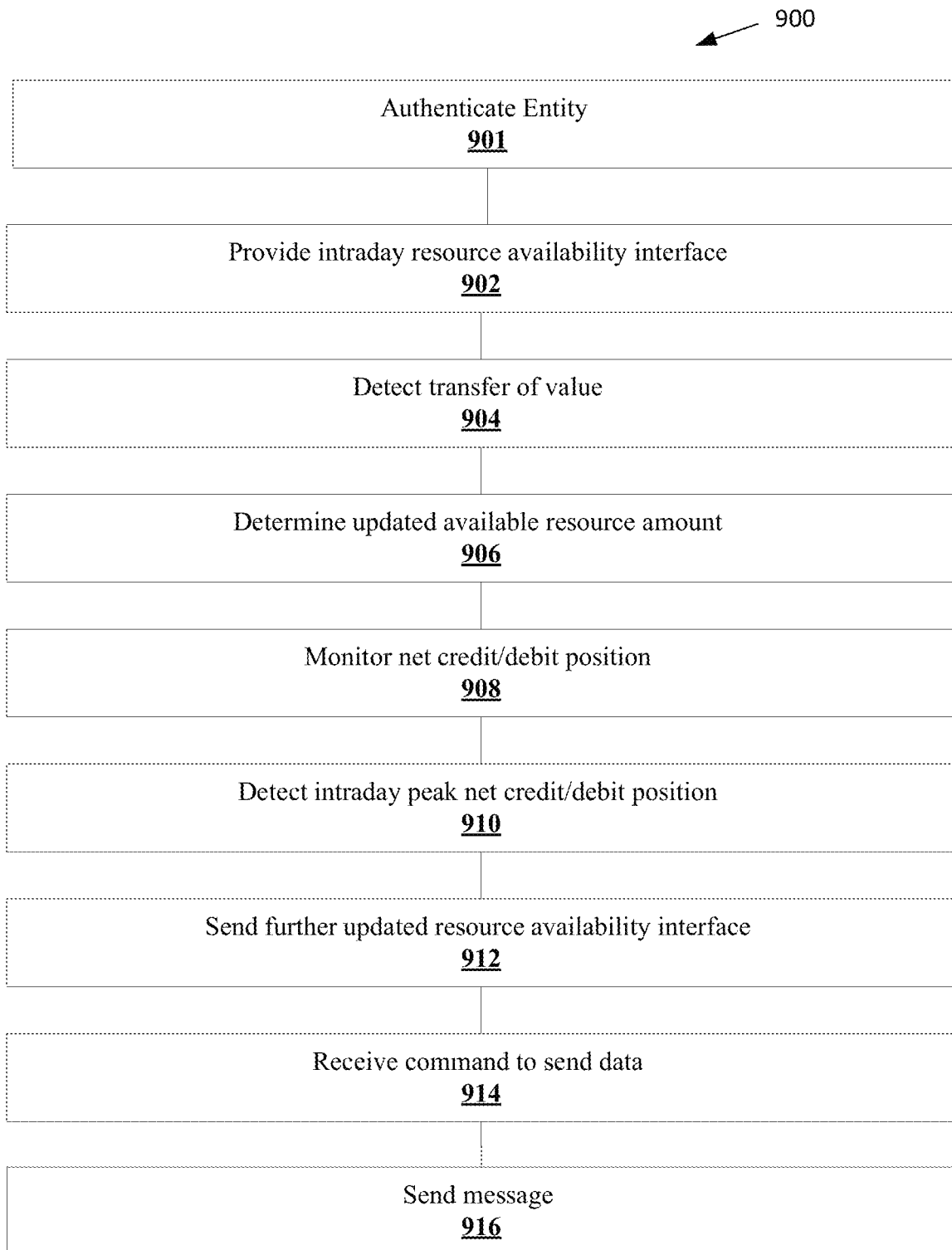
FIG. 9 is a flowchart of an example method in accordance with an example embodiment of the present disclosure.

Referring now to FIG. 9, a flowchart showing example operations performed by a server 160 is illustrated. The operations may be included in a method 900 which may be performed by the server 160. For example, computer-executable instructions stored in memory of the server 160 may, when executed by a processor of the server 160, configure the server 160 to perform the method 900 or a portion thereof. Operations 901 to 906 of the method 900 may correspond to operations 501 to 506 of the method 500 of FIG. 5.

At operation 908, the server 160 monitors a net credit position and/or a net debit position. The net credit/debit positions are monitored based on intraday transfers into and out of the accounts (i.e., the storage locations that store owned resources for the entity). At operation 910, the server 160 may detect an intraday peak net credit/debit position. In at least some embodiments, the server 160 may track multiple peak positions for both credit and debit. For example, the server may track the top five peak credit positions and top five peak debit positions for the day. Accordingly, detecting a "peak" credit/debit position may include detecting that a current credit or debit position is higher than the lowest of the existing top five peak credit or debit positions (which may be reflected in the peak position data 480). The server 160 may determine a length or duration of the peak position and/or a time of the peak position.

At operation 912, in response to detecting the intraday peak net credit/debit position, the server 160 sends, via the communications module and to the client device, a further updated resource availability interface. The further updated resource availability interface includes the detected intraday peak net credit position. For example, the position monitor 660 may be updated to include the detected peak net credit/debit position. Further, peak position data 480 in the entity account record 400 (FIG. 4) may be updated to reflect the identified peak. The server 160 may also update the peak position data 480 in the record 400.

At operation 914, the server 160 may receive, via the communications module and from the client device, a signal representing a command to send data, such as the peak net credit/debit position (i.e., the peak position data 480). For example, a sharing widget may be configured to receive input to send at least some data represented on the intraday resource availability interface to another computer system, such as another client device. In response to receiving input through the sharing widget, the server 160 may (at operation 916) automatically send a message to the other computer system. The message may contain the data associated with the received command.

Figure 10:
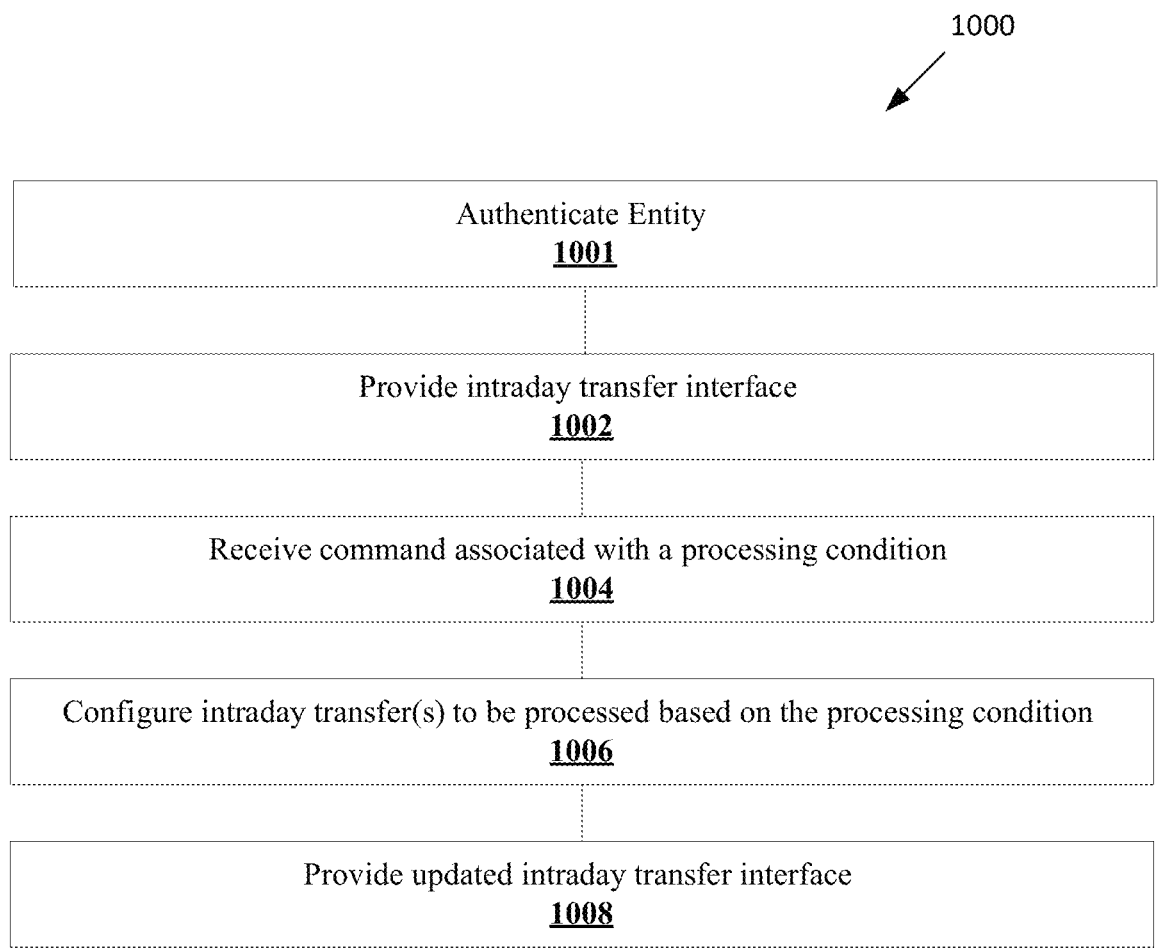
FIG. 10 is a flowchart of an example method in accordance with an example embodiment of the present disclosure.

Referring now to FIG. 10, a flowchart showing example operations performed by a server 160 is illustrated. The operations may be included in a method 1000 which may be performed by the server 160. For example, computer-executable instructions stored in memory of the server 160 may, when executed by a processor of the server 160, configure the server 160 to perform the method 1000 or a portion thereof.

At operation 1001, the server 160 authenticates the entity. Operation 1001 may be performed in the manner described above with respect to operation 501 of the method 500 of FIG. 5.

At operation 1002, the server 160 provides, via the communications module and to a client device associated with an authenticated entity, an intraday transfer interface. The intraday transfer interface may identify a plurality of intraday transfers for the authenticated entity. By way of example, the display screen of FIG. 7 may be displayed or the display screen of FIG. 8 may be displayed. The intraday transfer interface, which may also be referred to as an intraday resource availability interface 600, includes one or more widgets for managing processing of one or more of the identified intraday transfers. For example, an earmark widget 702, 802, prioritization widget 706, defer widget 704, release widget (which may provide a selectable option to remove the processing condition such as a deferral processing condition input through the defer widget), and/or reserve resources widget 804 may be provided on the intraday transfer interface.

At operation 1004, the server 160 may receive, via the communications module and from the client device, a signal representing a command input through the intraday transfer interface. The command may, for example, be input through the widget. The command may be associated with a processing condition for at least one of the plurality of intraday transfers.

In response to receiving the command, the server 160 may configure one or more of the intraday transfers to be processed based on the processing condition associated with the command (at operation 1006).

The command received at operation 1004 may be a defer command having a processing condition that causes the associated intraday transfer(s) to be suspended. In response to receiving such a command, the server may, at operation 1006, suspend processing of the associated transfer(s). Such processing may remain suspended until a release command is received which removes the suspension. The release command may be received via a widget which provides a selectable option to remove a processing condition, such as a release widget that provides a selectable option to input a release command to remove the suspension.

The command received at operation 1004 may be a prioritization command. The prioritization command is associated with a processing condition that specifies a processing priority of one or more of the intraday transfers. By way of example, a prioritization widget may be engaged to configure a transfer to be processed with "high", "medium"

or "low" priority. At operation 1006, the server 160 may configure a transfer to be processed in accordance with a priority level specified by or in association with the prioritization command. That is, the server 160 may configure the affected intraday transfer(s) to be processed according to the specified processing priority.

The command received at operation 1004 may be an earmark command. For example, the authenticated entity may be associated with an account having a record in a database and the record may reflect a borrowed resource balance. The borrowed resource balance may indicate an amount of borrowed resources that are available. This may include borrowed resources that have not been previously used, reserved or earmarked. When an earmark command is received through interaction with the earmark widget, the server 160 may, at operation 1006, configure one or more associated intraday transfers to be processed based on the processing condition by reserving at least a portion of the borrowed resource balance for such associated intraday transfers (which may be referred to as earmarked transfers). That is, the server 160 may set aside a portion of the borrowed resources and may only use that set aside portion to process the earmarked transfer(s).

In some implementations, the command received at operation 1004 may define a processing condition that includes or is associated with a rule that may be used by the server 160 to identify affected transactions and an action to be applied to such transactions. By way of example, the processing condition may include a threshold and an action and the threshold may be used to identify which of the transactions are to be processed according to the action. The action may be, for example, any of the processing conditions recited previously (e.g., a defer processing condition, a prioritization processing condition, an earmark processing condition, or a processing condition of another type). The processing condition may specify a comparison operation associated with the threshold. The comparison operation may, for example, be a greater than (>), less than (<), equal to (==), greater than or equal to (>=), or less than or equal to (<=) operation. By way of example, the processing condition may specify that the action is to apply to any transactions that are greater than the threshold. By way of further example, the processing condition may specify that the action is to apply to any transactions that are less than the threshold. At operation 1006, the server 160 may identify affected transaction(s) based on the processing condition and may configure such transactions to be processed based on the action. For example, the server 160 may, for at least one of the plurality of intraday transfers, compare a value associated with that intraday transfer to the threshold and, based on the comparison, selectively configure that intraday transfer to be processed according to the action.

The rule that may be used by the server 160 to identify affected transactions may take other forms apart from a threshold. For example, the processing condition may include transfer identification information for identifying affected intraday transfers and an action to be applied to the affected intraday transfers. The actions may be of the type described above. The transfer identification information may, for example, specify reference number criteria. In at least some such embodiments, at operation 1006, the server 160 may, for at least one of the plurality of intraday transfers that have been previously configured (and may be included on the intraday transfer interface), determine, based on the transfer identification information, that the action is to be applied to that intraday transfer. For example, the server may compare at least a portion of a reference number for the intraday transfer with the transfer identification information to determine that the action is to be applied to that intraday transfer. For example, the transfer identification information may specify a pattern or string of characters that is to be included in a reference number for affected transfers so that any transfers having such a pattern/string will be automatically processed in accordance with the action. In response to determining that the action is to be applied to the intraday transfer, the server configures that intraday transfer based on the action.

Other criteria for identifying affected transfers may be used instead of or in addition to the criteria specifically noted herein.

Once a rule has been defined for identifying transfers that are to be automatically processed according to an action, the identification of affected transfers may be ongoing. As transfers are added or created, they may be automatically processed according to the action if they satisfy the criteria defined for the rule (such as if they are on a particular side of the threshold).

Operation 1006 may include saving data such as a processing condition 470 to the entity account record 400.

At operation 1008, the server may provide, via the communication module and to the client device, an updated intraday transfer interface indicating processing of the transfer(s) according to the processing condition.

The server 160 may continue to process affected transfers in accordance with the processing condition.

In some instances, the server 160 may allow a client device associated with an authenticated entity to set aside a portion of a borrowed resource limit 460 (FIG. 4) for a specific date. That is, a client device may be permitted to input a future-dated borrowed resources reservation request to set aside an amount of borrowed resources for a specific date. Such borrowed resources will not be released until the specific date. On the specific date, the amount of borrowed resources that have been set aside will be released for use.

In some scenarios, the setting aside of borrowed resources may be complicated since balances, such as the first storage location balance 420 and the second storage location balance 440 and the borrowed resource balance 464 may only be determined with absolute certainty when a batch reconciliation process is completed and the batch reconciliation process may only be completed at certain periods throughout the day; for example, at the end of the day. In such scenarios, it may be that a future-dated borrowed resources reservation request may appear to be a request that may be implemented at the time when it is received, but it may be that, once such reconciliation occurs, it is only then determined that the request can no longer implemented. In such a scenario, an error message may be generated and the error message may be sent to a remote computing device, such as the client device through which the request was received.

Figure 11:
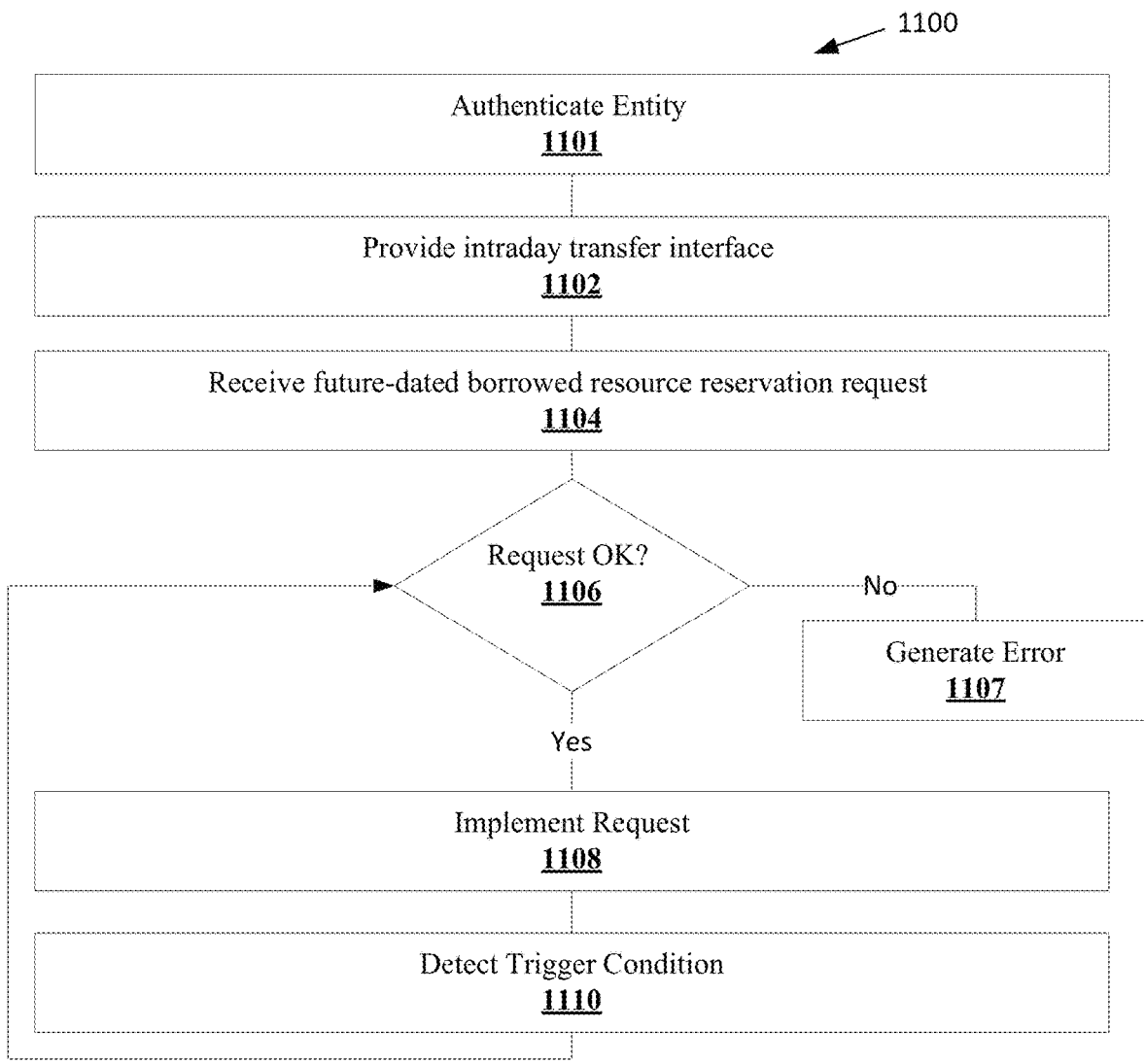
FIG. 11 is a flowchart of an example method in accordance with an example embodiment of the present disclosure.

An overview having been provided, reference will now be made to FIG. 11 which illustrates a flowchart showing example operations performed by a server 160. The operations may be included in a method 1100 which may be performed by the server 160. For example, computer-executable instructions stored in memory of the server 160 may, when executed by a processor of the server 160, configure the server 160 to perform the method 1100 or a portion thereof.

At operation 1101, the server 160 authenticates the entity. Operation 1101 may be performed in the manner described above with respect to operation 501 of the method 500 of FIG. 5. The entity may be authenticated at a client device operated by the entity such that further communications to the client device during the method 1100 may be considered to be communications with the entity.

At operation 1102, the server 160 provides, via the communications module and to the client device associated with the authenticated entity, an intraday transfer interface. The intraday transfer interface may be or include the intraday resource availability interface 600 described above with reference to one or more of FIGS. 6 to 8, or may include one or more features described above as being included in the intraday resource availability interface 600.

Figure 12:
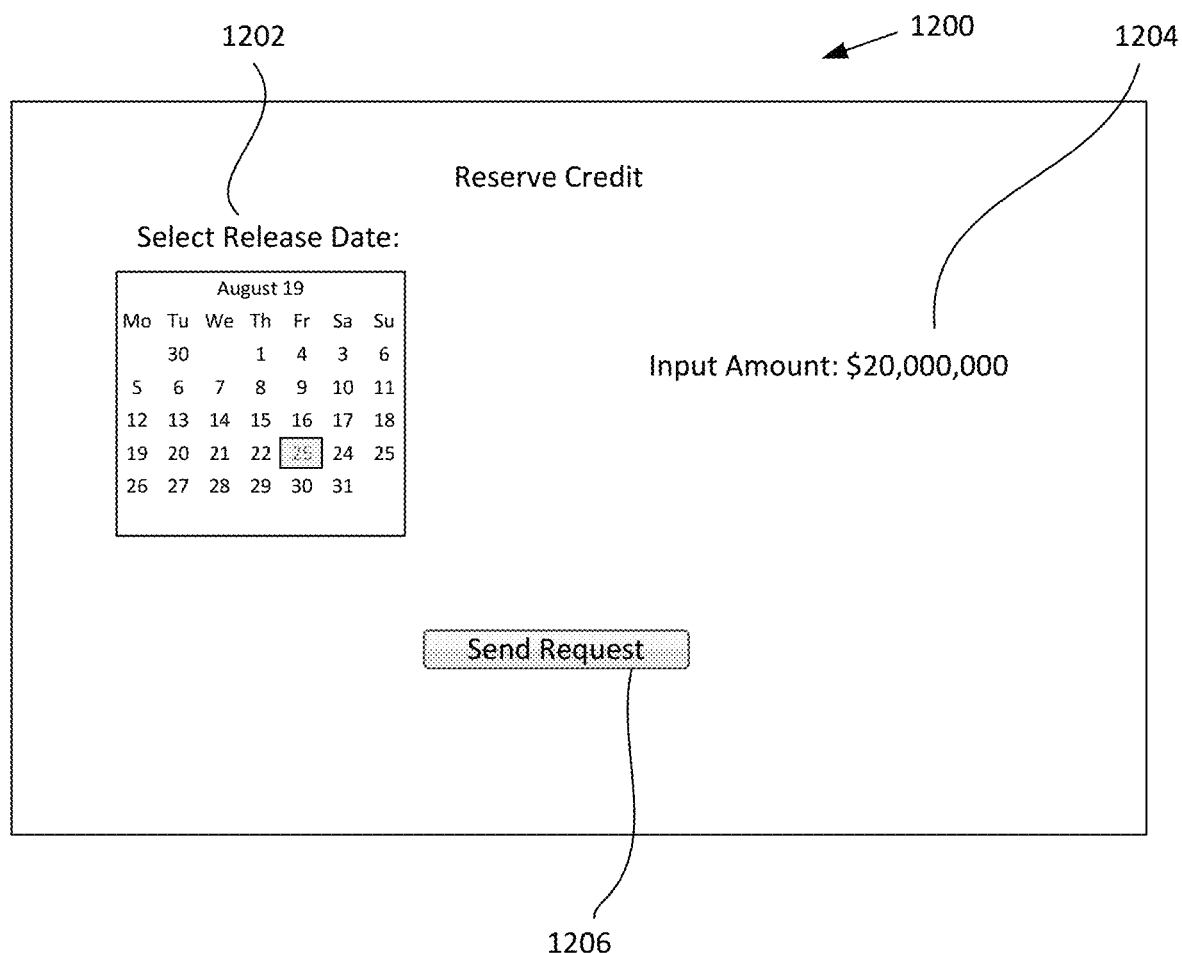
FIG. 12 is a further example display screen of an interface in accordance with an example embodiment.

An example intraday transfer interface 1200 is illustrated in FIG. 12. The example interface includes one or more widgets for inputting a future-dated borrowed resource reservation request. The widgets include a selectable option 1206 to issue a future-dated borrowed resource reservation request to set aside an amount of borrowed resources. The widgets also include one or more interface elements for configuring parameters associated with such a request. For example, a date selection interface element 1202 is included in the example interface and may be used to define a date of release for the future-dated borrowed resource reservation request.

The date selection interface element 1202 may be configured to prevent selection of one or more dates or, put differently, to only enable selection of defined dates. For example, the date selection interface element 1202 may prevent selection of one or both of a past date and a current date. In at least some embodiments, the date selection interface element 1202 may prevent selection of a date that is deemed too far in the future. Whether a date is "too far" is determined based on a threshold time period. For example, in at least some embodiments, the date selection interface element 1202 may only allow selection of a date that is within a threshold number of days of a current date. Selection of a non-selectable date may be performed by either not allowing such a date to be selectable (e.g., by limiting the dates displayed for selection to only those that are selectable) or by issuing an error message when selection of an inappropriate date occurs (e.g., "the date must be in the future" or "the date cannot be more than 10 days in the future"). In at least some embodiments, the server 160 operates to prevent selection of the one or more dates by, for example, configuring the date selection interface element 1202 to prevent such selection or by generating the error message when selection of an inappropriate date occurs.

The widgets on the intraday transfer interface 1200 may include an amount selection interface element 1204. The amount selection interface element 1204 may, for example, allow the authenticated entity to input a numerical value. The numerical value represents an amount of borrowed resources that are to be reserved for the selected date. The amount selected interface element 1204 may be configured to prevent selection of certain amounts. For example, the inputted number may be required to be greater than zero and less than or equal to a defined threshold. The defined threshold may be, for example, the borrowed resource limit 460 or may be the borrowed resource balance 464. That is, the authenticated entity may only be permitted to reserve an amount of borrowed resources, such as credit, that does not exceed the total borrowed resources currently available, as defined by the borrowed resource balance 464. Selection of a non-selectable amount may be performed by either not allowing certain amounts to be selectable (e.g., by using a slider for selection which is bound by zero and the defined threshold) or by issuing an error message when selection of an inappropriate amount occurs (e.g., "the amount cannot be less than zero" or "You currently only have $15,000,000 left on your credit line. Please select an amount that is less than $15,000,000"). In at least some embodiments, the server 160 operates to prevent selection of certain amounts by, for example, configuring the amount selection interface element 1204 to prevent such selection or by generating the error message when selection of an inappropriate amount occurs.

In the example the amount selection interface element 1204 is a numerical input field. However, other interface elements may also be used including, for example, a slider.

After an authenticated entity has input a date and amount, the selectable option 1206 to issue a future-dated borrowed resource reservation request may be used to issue the future-dated borrowed resource reservation request to set aside the amount of borrowed resources for the specified date.

Referring again to FIG. 11, at operation 1104, the server 160 receives, via the communications module and from the client device, a signal representing a future-dated borrowed resource reservation request. The future-dated borrowed resource reservation request is associated with an amount of borrowed resources to set aside and a date of release of such borrowed resources. For example, in at least some embodiments, the future-dated borrowed resource reservation request may include the amount (e.g., the amount input at the client device through the amount selection interface element 1204) and/or the date (e.g., the date input at the client device through the date selection interface element 1202). The future-dated borrowed resource reservation request may be a request to set aside at least a portion of a credit limit or line of credit for use on the specified date.

Next, at an operation 1106, the server 160 may evaluate the future-dated borrowed resource reservation request based on a current amount of borrowed resources.

In at least some embodiments, the server 160 may attempt to track the current amount of a borrowed resource balance in real-time or near real-time. For example, the server 160 may determine an estimate of the current amount of borrowed resources by adjusting an opening amount of available resources to account for intraday transfers completed. As noted above, the server 160 may, in at least some embodiments, provide a running total resource indicator 634 and/or a current running total resource indicator 692 for display on one or more of the interfaces. In order to do so, the server may adjust an opening balance (i.e., the balance at the beginning of the day) in order to account for any transfers during the day. For example, the opening balance may be adjusted to account for pending and/or posted transactions. When the adjusted balance indicates a negative number, this may signify that borrowed resources are currently being used since all owned resources have been used.

Accordingly, the server may determine an estimate of the current amount of borrowed resources at any given time during the course of the day. For example, the server may determine at estimate at or around the time the future-dated borrowed resource reservation request is received. The server may then, at operation 1106, evaluate the future-dated borrowed resource reservation request based on the estimate of the current amount of borrowed resources. The evaluation may, for example, include determining whether the estimate of the current amount of borrowed resources is sufficient to allow for setting aside of the specified amount of borrowed resources (e.g., if the estimate of the current amount of borrowed resources is greater than or equal to the amount associated with the request received at operation 1104).

When the evaluation of the future-dated borrowed resource reservation request based on the estimate of the current amount of borrowed resources indicates that the future-dated borrowed resource reservation request cannot be implemented, the server 160 may generate an error (operation 1107). For example, the server 160 may send an error message, via the communications module, to a computing device such as, for example, the client device. For example, the intraday transfer interface may be updated with or based on the error message.

The error message may cause the computing device to include a selectable option to, for example, vary the specified amount. For example, an amount selected interface element 1204 may again be displayed. In at least some embodiments, the amount selected interface element 1204 may be configured to default to the estimated current amount of borrowed resources. The server may then receive a further future-dated borrowed resource reservation request (e.g., another iteration of operation 1104 may be performed).

When the evaluation of the future-dated borrowed resource reservation request based on the estimate of the current amount of borrowed resources indicates that the future-dated borrowed resource reservation request can be implemented based on the estimated current amount of borrowed resources, the server 160 may, at operation 1108, implement the request. For example, the server may store a retention instruction in memory. The retention instruction may operate to reserve and/or attempt to reserve, the specified amount of borrowed resources for the specified date. Accordingly, the retention instruction may include both the reserved amount and the date of release.

The retention instruction may be implemented by, for example, updating the reserved borrowed resource amount 466 (FIG. 4) in memory. When various user interface screens are displayed, they may be displayed in a manner that indicates that the reserved amount is unavailable if they are displayed prior to the date of release. For example, the example intraday resource availability interface 600 described above with reference to FIGS. 6 to 8 may be updated to reflect the reservation. By way of example, various indicators that are displayed on the intraday resource availability interface 600 may be updated due to the reservation. For example, the reserved resource indicator 622 may be updated to reflect a higher amount of reserved resources due to the future-dated reservation. Other indicators that depend on the amount of borrowed resources available may also be updated.

While the retention instruction is in effect, the server 160 may prevent use of the associated borrowed resources. For example, the server may, at some time while the retention instruction is in effect, receive, via the communications module and from the client device, a signal representing an instruction to process a transfer. In response, the server may determine whether processing the transfer would violate the retention instruction. For example, the server may determine whether sufficient resources are available to process the transfer without having to use the resources reserved by the retention instruction. In response to determining that processing the transfer would violate the retention instruction, the server generates an error. For example, the server may send an error message, via the communications module, to a computing device such as the client device. The error message may, for example, indicate that the transfer cannot be completed and/or may provide a selectable option to remove or vary the retention instruction.

In implementing the request, the server 160 may track the date associated with the request so that, on that date, the reserved borrowed resources will be released. After the resources are released, transfers will again be permitted to use the associated resources. Furthermore, in implementing the request, the server may also, on the date associated with the request, update any of the indicators on the intraday resource availability interface 600 that rely upon the amount of borrowed resources that have been reserved. For example, reserved resource indicator 622 may be updated to reflect a higher amount of available borrowed resources due to the release of the future-dated reservation.

As noted above, in some scenarios, the setting aside of borrowed resources may be complicated since balances, such as the first storage location balance 420 and the second storage location balance 440 and the borrowed resource balance 464 may only be determined with absolute certainty when a batch reconciliation process is completed and the batch reconciliation process may only be completed at certain periods throughout the day; for example, at the end of the day. In such scenarios, it may be that a future-dated borrowed resources reservation request may appear to be a request that may be implemented at the time when it is received, but it may be that, once such reconciliation occurs, the request can no longer implemented. Accordingly, in at least some embodiments, the server 160 may evaluate the request in response to a trigger condition.

For example, the server may, at operation 1110, detect a trigger condition and may, in response, evaluate (at operation 1106) the future-dated borrowed resource reservation request based on a current amount of borrowed resources.

The trigger condition may, for example, be an end-of-day reconciliation of resource tracking data. That is, after a reconciliation of ledgers identifying available resources has been performed to account for all transfers occurring during the day (e.g., all settled transactions), the trigger condition may be said to have occurred. The trigger condition may, for example, be said to have occurred after the batch processing is performed on the day in which the future-dated borrowed resource reservation request has been received. That is, on the date the request is received, the server may wait until after the end-of-day reconciliation has been performed in order to evaluate (or re-evaluate in instances where operation 1106 has already been performed based on an estimate) the future-dated borrowed resource reservation request based on the current amount of borrowed resources. The current amount of borrowed resources used for the evaluation is the amount of borrowed resources available following the reconciliation.

The server may, for example, determine (at operation 1106) that the future-dated borrowed resource reservation request cannot be implemented when the resource tracking data (which is the data reflecting a current amount of borrowed resources available following the reconciliation) indicates that the current amount of borrowed resources is less than the specified amount of borrowed resources.

When the evaluation of the future-dated borrowed resource reservation request indicates that the future-dated borrowed resource reservation request cannot be implemented based on the current amount of borrowed resources, the server 160 may perform operation 1107 as described above and, more particularly, generate an error by sending an error message, via the communications module, to a computing device such as the client device from which the request was received at operation 1104.

When the evaluation of the future-dated borrowed resource reservation request indicates that the future-dated borrowed resource reservation request can be implemented based on the current amount of borrowed resources, the server 160 may perform operation 1108 as described above.

Other trigger conditions may be used instead of or in addition to the trigger condition noted above. For example, in at least some embodiments, detecting the trigger condition may include detecting an end-of-day reconciliation of resource tracking data performed on a day immediately prior to the date of the release. That is, the day before the resources are scheduled to be released, the request may be evaluated to ensure that the resources can, in fact, be released as scheduled.

By way of further example, detecting a trigger condition may include determining that the current date is the specified date for the request/retention instruction. That is, when the date on which the resources are scheduled to be released occurs, the server 160 may evaluate the request again to ensure that it may be implemented.

Transfers, which may also be referred to as transactions or electronic transfers may pass through numerous computer systems during processing. For example, in some instances intermediary or correspondent banking servers may facilitate transactions. For example, an intermediary bank may be used when a transfer is being made between accounts associated with two banks that do not have a relationship with one another.

Furthermore, even internally at a particular bank, various servers may be engaged in order to process a transfer. Given the numerous computer systems that may be involved in processing a transfer, it can be difficult for a transferring party who configured a transfer to communicate with a system that is currently processing the transfer.

An interface, which may be referred to as a user interface or input interface, may be configured to provide real-time or near real-time tracking of transfer processing. Conveniently, the interface may provide such tracking even though the transfer may pass through numerous systems during processing. For example, the systems which the transfer passes through may include both internal and external systems and the interface may track the transfer both internally and externally. Accordingly, status of a transfer may be instantly tracked even though the transfer may pass through numerous systems which are at geographically disparate locations.

Further, the interface may allow a user to communicate directly with a current processing system. For example, a user may be able to send an electronic notification to a system that is currently processing the transfer.

Since some processing stages of a transaction may be completed almost instantly, the real-time or near real-time tracking of transfer processing ensures that the data provided on the user interface is current. This avoids, for example, a user issuing notifications to a system that is no longer handling a transfer.

Figure 13:
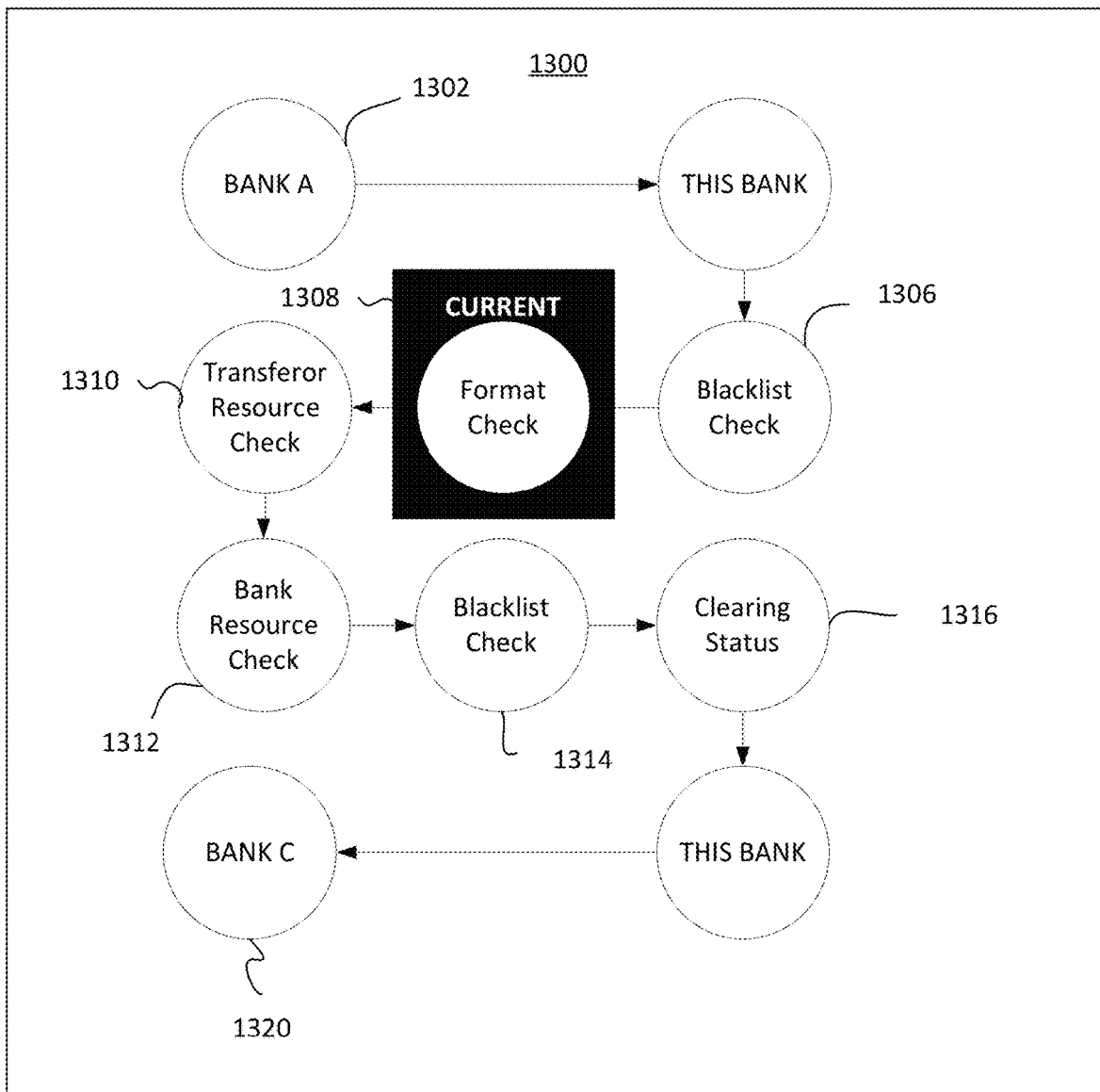
FIG. 13 is a further example display screen of an interface in accordance with an example embodiment.

Reference will now be made to FIG. 13 which illustrates a display screen 1300 of an example transfer interface. The display screen 1300 may be displayed on a client device 150. The transfer interface may be provided as part of the intraday resource availability interface 600 described above with reference to FIGS. 6 to 8. Accordingly, the intraday resource availability interface 600 may also be referred to as a transfer interface.

In some implementations, a display screen 700 such as that displayed above with reference to FIG. 7 may list a plurality of transfers undergoing processing. The display screen 700 of the transfer interface may include one or more interface elements for selecting one or more of the transfers in the plurality of transfers displayed thereon and the display screen 1300 of FIG. 13 may be displayed in response to receiving a selection of a particular transfer.

The example display screen 1300 of FIG. 13 identifies a plurality of processing operations in a series of processing operations. The series of processing operations are processing operations that are performed on the transfer in order to process the transfer. The display screen identifies one of the processing operations in the series as a current processing operation. In the example illustrated, the series of processing operations that are identified include a blacklist check operation which is identified by a blacklist check indicator 1306. The blacklist check operation is an operation in which a processor evaluates whether completing the transfer would violate a blacklist. The blacklist may, for example, be a sanctions blacklist which identifies various parties and/or accounts to which transfers are prohibited due to a sanction. Other control checks may be performed instead of or in addition to the blacklist check. For example, anti-money laundering analysis may be performed on a transfer to determine whether completion of the transfer would violate anti-money laundering (AML) rules defined in a system and/or a fraudulent transfer analysis may be performed on the transfer to determine whether the transfer appears to be fraudulent.

The blacklist check may, instead, be referred to as an AML check or screening, a sanctions check or screening, a control check or screening, and/or a fraud check or screening.

In the example, after the blacklist check is a format check represented by a format check indicator 1308. The format check may be referred to, for example, as a straight through processing (STP) check. The format check may indicate whether the transfer is in a format that will allow straight through processing to be completed. Some transfers may arrive at the server 160 by way of an electronic message, such as a SWIFT message. Since SWIFT messages are free format messages (in the sense that the SWIFT network will allow such messages to be sent even if they do not contain all data necessary to complete a transfer), it is possible that a message representing a transfer may be received that does not include sufficient data to allow processing of the transfer to be completed. By way of example, certain required information may be omitted from the transfer message. The format check may evaluate whether the message includes required data. When the message does not include all such data, the server 160 may attempt to automatically repair the message. For example, the server may rely on stored data representing past transfers to infer certain missing data.

In the example, after the format check is a transferor resource check which is represented by a transferor resource indicator 1310. The transferor resource check is a resource check for a transferor. Such a check may be performed by querying a database to identify available resources for a transferor. More specifically, the transferor resource check may ensure that the transferor has sufficient resources to complete the transfer.

In the example, after the transferor resource check is a financial institution resource check, represented by a financial institution resource indicator 1312. The financial institution resource check may also be referred to as a large value transfer system (LOTS) system check. During this check, the server 160 may ensure that the financial institution itself has sufficient resources (such as credit) at a central bank, such as the Bank of Canada, in order to complete the transfer.

In the example, after the financial institution resource check, the control check(s) including the blacklist check may be performed again. Accordingly, a further blacklist check indicator 1314 may be displayed. The control checks may be re-performed on the transfer since the transfer may have been updated (e.g., during the format check) or since the blacklist may have changed.

In the example, after the further control check(s) are performed, the transfer may be cleared. A clearing status may be updated. Accordingly, a clearing status indicator 1316 may be included on the display screen 1300 to indicate whether or not the transfer has been cleared.

The example display screen illustrates which of the processing operations have already been performed, which of the processing operations are currently being performed and which of the processing operations still need to be performed in the future. In the example, the format check operation is highlighted with a current operation indicator to indicate that the format check operation is currently being performed. In at least some embodiments, the current processing operation is selectable to input a processing command which causes the server 160 to perform a processing operation. The processing command may be, for example, an instruction to send an electronic message to a computer system involved in performing the current processing operation. For example, an electronic message may be sent to such a system to request further details about the current processing operation (e.g., a reason as to why the processing operation is held up, information that is required in order to complete the processing operation, etc.).

The example display screen illustrates an order of the processing operations in the series. By indicating the current processing operation in the series, the example display screen effectively indicates which of the processing operations have already been performed and which of the processing operations still need to be performed.

The indicators mentioned above indicate processing operations in a series of processing operations at a particular financial institution. However, transfers may go through multiple processing institutions before completion. For example, intermediary or correspondent banks may sometimes be used to assist with a transaction. Since multiple banks may be involved, the transfer may need to undergo both internal and external processing before completion. The example display screen 1300 may provide data regarding external processing together with data regarding internal processing. Put differently, the example display screen 1300 may provide data regarding processing that is occurring at a particular bank and processing that has or needs to occur on the transfer outside of the particular bank. The server 160 may, for example, obtain external processing data from a third party server and the external processing data may be used to provide one or more indicators 1302, 1320 of external processing. For example, in the example display screen a first external bank indicator 1302 indicates a bank that the transfer originated at and a second external bank indicator 1320 indicates a bank that the transfer will complete at. The external processing data may, therefore, include hop information about various banks that are involved in processing the transfer and the display screen 1300 may be prepared based on the hop information. By way of example, the hop information may indicate one or more of: a number of hops of a message, a fee at one or more of the hops, and an exchange rate applied at one or more of the hops. The display screen 1300 is generated to illustrate a present bank's order in a list of banks involved in processing a transfer (i.e., the position of the bank associated with the server 160 relative to other servers, systems or institutions processing the same transfer).

Figure 14:
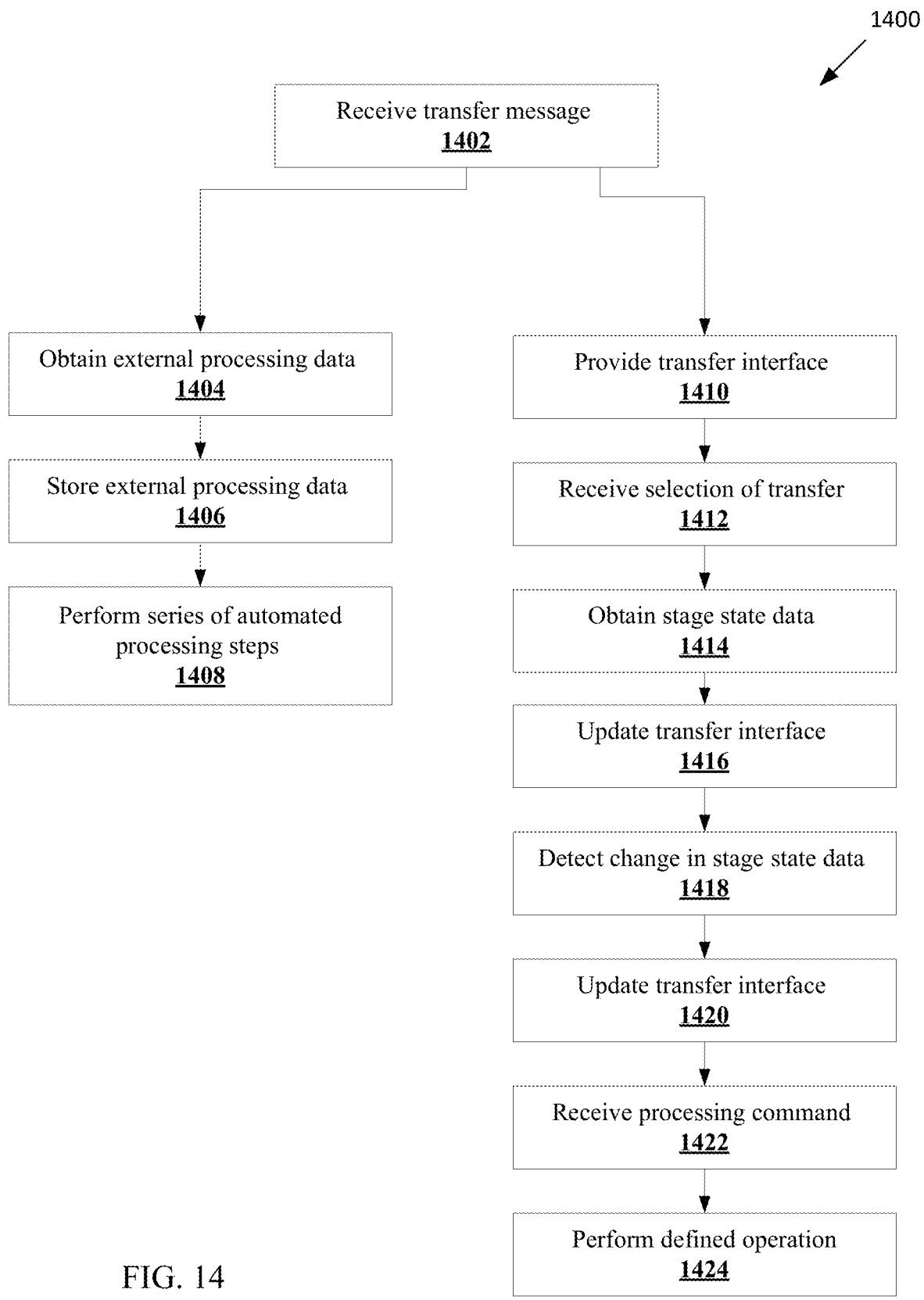
FIG. 14 is a flowchart of an example method in accordance with an example embodiment of the present disclosure.

Referring now to FIG. 14, a flowchart showing example operations performed by a server 160 is illustrated. The operations may be included in a method 1400 which may be performed by the server 160. For example, computer-executable instructions stored in memory of the server 160 may, when executed by a processor of the server 160, configure the server 160 to perform the method 1400 or a portion thereof.

At operation 1402, the server 160 receives a transfer message via a communications module. The transfer message is a message representing a request for a transfer. The transfer message may be received from a third party server 190 (FIG. 1) or from a client device 150. By way of example, the third party server 190 may be a server associated with another financial institution. The third party server 190 may be, in at least some embodiments, a SWIFT network server. The SWIFT network server may relay messages between computer systems. The transfer message may be a SWIFT message. SWIFT messages are messages in which certain information that is required for processing a transfer may be omitted. Since required information may be omitted, SWIFT messages may be considered free format messages.

The transfer message includes metadata such as, for example, an identifier of a recipient bank, contact information of a recipient bank, a recipient's bank account number, a recipient's name, a recipient's address, a routing number. The transfer message may be, for example, a SWIFT message formatted according to the MT103 format type.

The transfer message may, in some instances, be received from a client device. More specifically, the client device may configure the transfer message by inputting the metadata for the transfer message.

In some instances, after the transfer message is received, the server 160 may obtain (at operation 1404) additional information from a third party server 190 about the transfer message. For example, a third party server 190 associated with a transfer network such as the SWIFT network may provide an interface, such as an application programming interface, that allows the server 160 to obtain external processing data for the transfer message. The external processing data may, for example, indicate hop information for the message. For example, the hop information may identify other banks that have been or will be involved in processing the message. By way of further example, the hop information may indicate one or more of: a number of hops of a message, a fee at one or more of the hops, and an exchange rate applied at one or more of the hops. The hop information may provide the server 160 with information about processing that has or will occur at other computing systems apart from the server. For example, the exchange rate or other fees applied by another bank that was or will be involved in the transfer may be provided to the server. Additionally, the hop information allows the server to know its own order within a list of systems involved in processing a transfer. That is, the server may use the hop information to determine whether the transfer has already passed through other banks and/or whether the transfer will have to pass through other banks.

Obtaining the external processing data may include, for example, sending, via the communications module and to a third party server, a request for external processing data associated with the message. The request may be, for example, an API call or an electronic communication of another type. The request includes identifying information which may be obtained from the transfer message. In response to sending the request, the server 160 then receives, via the communications module and from the third party server, the external processing data associated with the message. The server 160 may, at operation 1406, store the external processing data in memory, for example.

After the transfer message is received, the server 160 may process the transfer. More specifically, the server 160 may perform (at operation 1408) a series of automated processing operations (which may also be referred to as automated processing steps) on the message. The automated processing operations may, for example, include at least a first processing operation and a second processing operation. The automated processing operations may correspond to those discussed above with reference to the display screen 1300 of FIG. 13. Each of the processing operations are computer-based operations which are performed automatically on the message.

Figure 15:
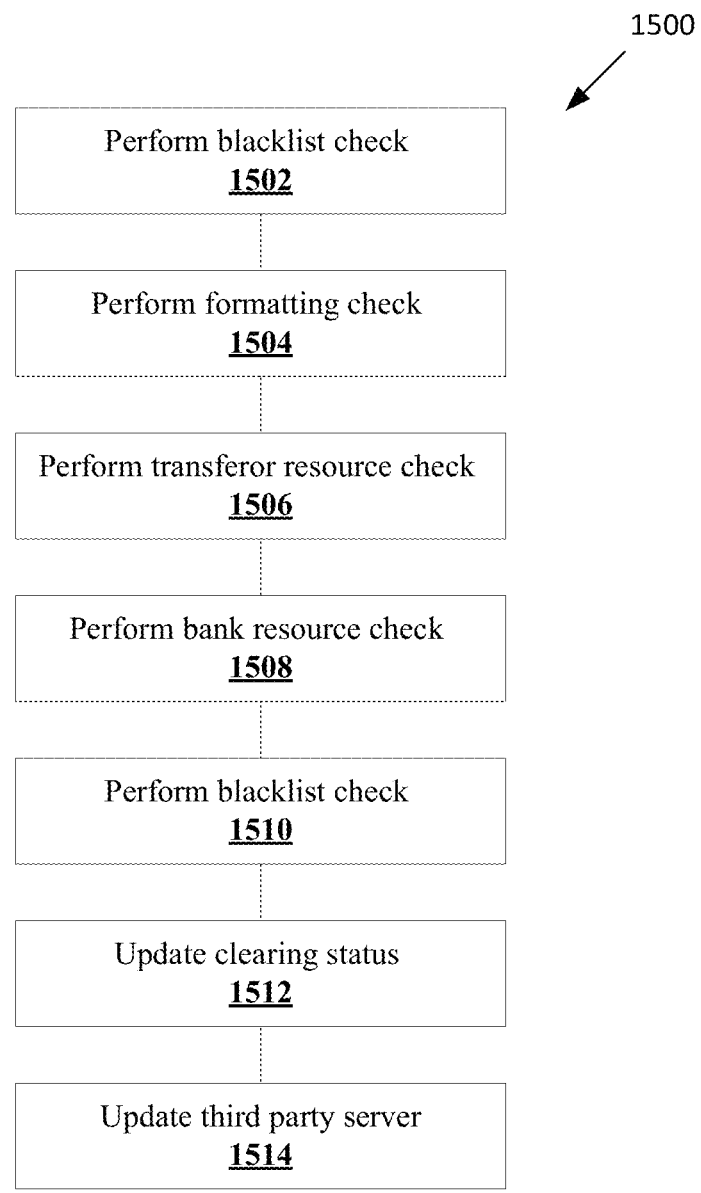
FIG. 15 is a flowchart of an example method in accordance with an example embodiment of the present disclosure.

Referring now to FIG. 15, an example series of processing operations 1500 that may be performed by the server 160 will now be discussed. The series of processing operations may be performed by the server during operation 1408 of the method 1400. After each of the operations in the series, the server 160 may update stage state data in memory to indicate that a particular processing operation has been completed and/or that a next processing operation is being performed.

At operation 1502, the server 160 performs a blacklist check or, more generally, a control check. For example, the server 160 may compare data in the message to a blacklist. The blacklist may, for example indicate one or more entities or countries to which transfers are not permitted. By way of example, the blacklist may include one or more entities or countries on a sanctions list. The blacklist check and control check are referred to in greater detail above with reference to the discussion of the blacklist check indicator 1306 of FIG. 13. The message may be determined to have failed the blacklist the blacklist check when data in the message corresponds to an entry in the blacklist.

Next, at an operation 1504, the server 160 may perform a formatting check on the message. As noted above, the transfer message may be a free format message in which certain requisite information may be omitted. At operation 1504, the server may evaluate whether the message includes required data. If the message does not include such required data, the message may be determined to have failed the formatting check. In at least some embodiments, during the formatting check, the server may attempt to repair a message that is incomplete. The formatting check is described in greater detail above with reference to the format check indicator 1308 of the display screen 1300 of FIG. 13.

Next, at an operation 1506, the server 160 may perform a transferor resource check operation. The transferor resource check may be performed as described above with reference to the discussion of the transferor resource indicator 1310 of the display screen 1300 of FIG. 13. For example, the server may perform the resource check for the transferor by querying a database to identify available resources for the transferor. The message may be determined to have failed the transferor resource check when the transferor is determined to have insufficient resources to complete the transfer.

Next, at an operation 1508, the server may perform a bank resource check. This check may be performed as described above with reference to the discussion of the financial institution resource indicator 1312 of the display screen 1300 of FIG. 13. The message may be determined to have failed the bank resource check when the financial institution associated with the server 160 has insufficient resources for completion of the transfer.

Next, at an operation 1510, the server may again perform a control check, such as a blacklist check. This check may be performed in the same or a similar manner as at operation 1502. This secondary blacklist check is performed in case the blacklist has been modified during the subsequent processing operations or in case additional detail added to the message during the formatting check (operation 1504) would make the message non-compliant with a control.

Next, at operation 1512, a clearing status check may be performed. That is, after the prior checks are satisfactorily performed, the server 160 may process the transfer. In doing so, the server 160 may monitor a clearing status in order to determine whether or not the transfer has yet cleared.

After the transaction has cleared, the server 160 may send a message to a third party server 190, such as a server associated with the SWIFT network to update a clearing status at the SWIFT network. That is, the server 160 may inform the SWIFT network that the transfer has now cleared.

At each processing operation in the series of processing operations, control will only proceed to a next processing operation when prior processing operations have been completed. That is, the processing operations are performed in a serial manner. Some operations may complete processing almost instantly. Some messages may, however, get held up at a given processing stage for a lengthy period of time.

Message processing at each of the various operations 1502-1514 in the series of operations may vary and the server 160 may address processing failures differently depending upon which of the operations are being performed. For example, for certain operations (such as the blacklist check and/or formatting check), when a message fails processing, a notification may be sent to an administrator device. The administrator device may include controls for inputting a release command to the server 160 which may be treated by the server as an instruction to treat the message as having passed the check. Some operations (e.g., the various resource checks) may not be controlled with such a release command. Instead, when a check is determined to have failed, the server may continue to re-evaluate the message to determine if conditions have changed such that the message no longer fails the check. For example, a transferor resource check which initially failed because the transferor had insufficient funds may be passed when the transferor replenishes funds.

Figure 16:
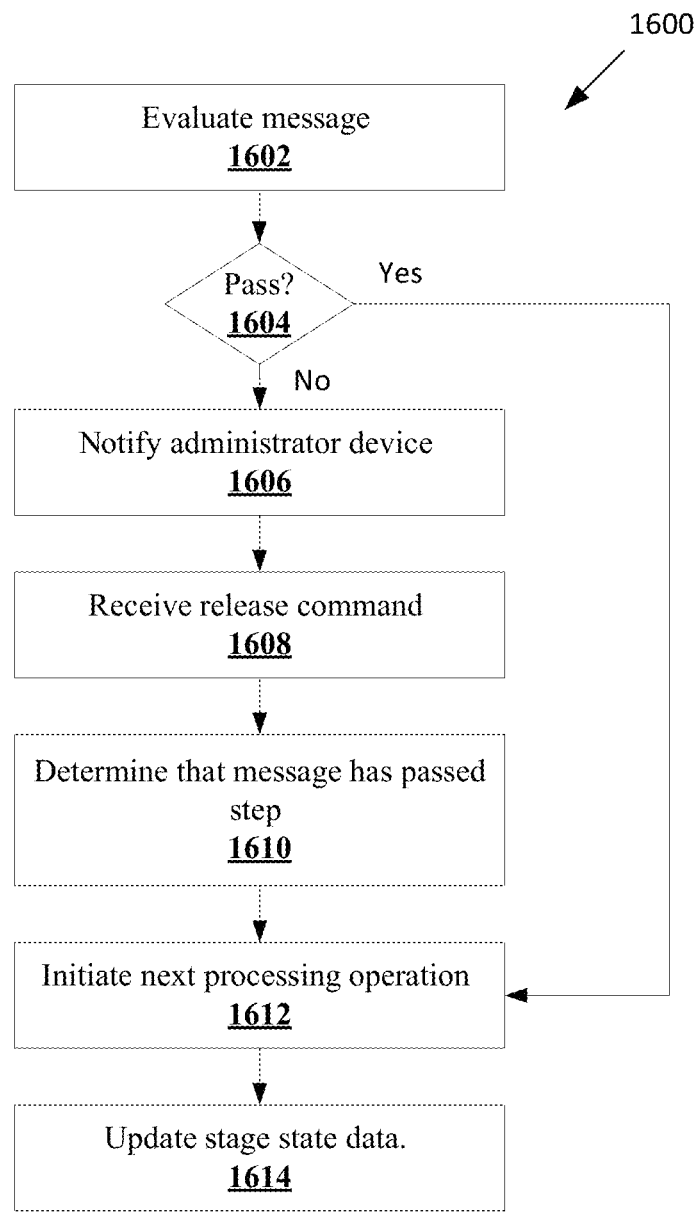
FIG. 16 is a flowchart of an example method in accordance with an example embodiment of the present disclosure.

An example processing operation 1600 is illustrated in FIG. 16. The processing operation may be one of the processing operations in the series of processing operations 1500 of FIG. 15. At operation 1602, the server 160 evaluates the message based on defined criteria to determine whether the message passes the processing operation or fails the processing operation. The processing criteria is, as described above with reference to FIGS. 13 and 15. For example, the control check criteria may involve a comparison of message contents to a blacklist.

When the message passes the processing operation (as illustrated at operation 1604), control flow may proceed to operation 1612 where a next processing operation is initiated. The server 160 may also update (operation 1614) stage state data to reflect the fact that the processing operation has been successfully completed and that control flow has proceeded to the next operation.

When the message fails the processing operation, the server 160 may, at operation 1606, send, via the communications module, a notification to an administrator device. The administrator device that is notified may be a device that is specifically associated with the processing operation being performed. As noted above, the administrator device may include controls for inputting a release command to the server 160 and so a release command may be received at operation 1608. Upon receiving the release command from the administrator device, the server may determine that the message has passed the first processing operation (operation 1610). Then, control flow may proceed to operations 1612 and/or 1614. That is, the server may initiate the second processing operation for the message and update stage state data stored in the memory to reflect that the second processing operation has been initiated.

Figure 17:
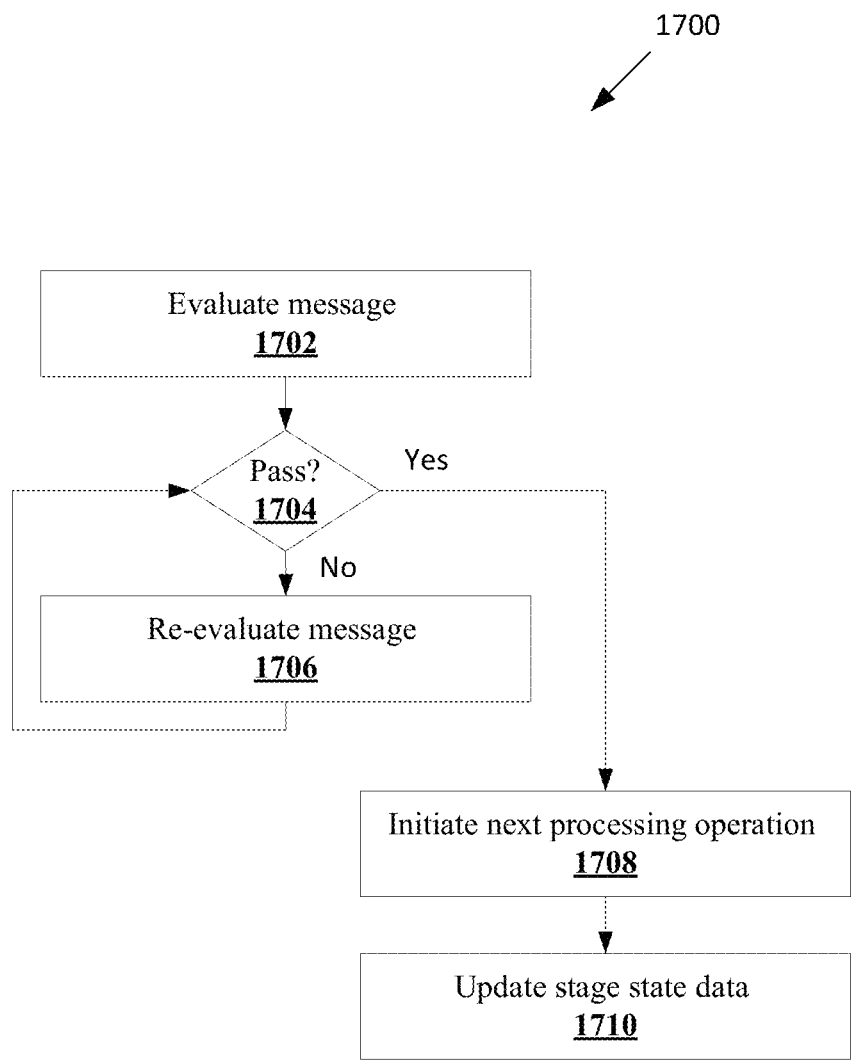
FIG. 17 is a flowchart of an example method in accordance with an example embodiment of the present disclosure.

As noted above, not all processing operations may be cleared through input of a release command at an administrator device. An example of one such processing operation 1700 is illustrated in FIG. 17.

The processing operation 1700 may be one of the processing operations in the series of processing operations 1500 of FIG. 15. At operation 1702 the server 160 may evaluate the message based on defined criteria to determine whether the message passes the processing operation or fails the processing operation. The processing criteria is, as described above with reference to FIGS. 13 and 15. For example, the transferor resource check may involve a ensuring that a transferor has sufficient resources for the transfer.

When the message passes the processing operation (as illustrated at operation 1704), control flow may proceed to operation 1708 where a next processing operation is initiated. The server 160 may also update (operation 1710) stage state data to reflect the fact that the processing operation has been successfully completed and that control flow has proceeded to the next operation.

When the message fails the processing operation, the server 160 may continue to re-evaluate the message (operation 1706) until it is determined (operation 1704) that the message has passed the processing operation. Accordingly, the server may repeatedly re-evaluate the message based on the defined criteria until the message is determined to have passed the processing operation and, when the message is determined to have passed the processing operation, the server may then initiate a next processing operation for the message and may again update the stage state data stored in the memory to reflect that the next processing operation has been initiated.

Referring again to FIG. 14, while the series of automated processing operations 1500 (FIG. 15) are being performed, a client device 150 operated by an entity associated with the transfer to which the message relates may obtain real-time status updates about the progress of the processing operations. The computing systems may utilize the techniques herein to obtain current information even though some processing operations may be completed almost instantly. Further, the computing systems allow real-time status information to be obtained even though processing operations may be performed in a distributed manner. Additionally or alternatively, an interface may be provided which allows an operator of a client device to provide an instruction directly to a computer system that is currently performing a processing operation on a message.

Accordingly, while the series of automated processing operations are being performed (operation 1408), the server 160 may receive a request from a client device associated with an authenticated entity (e.g., who has authenticated themselves to the server in the manner described above with reference to operation 501 of the method 500 of FIG. 5). At operation 1410 of the method 1400, the server 160 provides a transfer interface to the client device. Accordingly, while the series of automated processing operations are being performed, the server may provide, via the communications module and to the client device associated with an authenticated entity, a transfer interface. The transfer interface may, for example, be or include a display screen listing a plurality of transfers (see, e.g., FIG. 7). The transfer interface may include an interface element for selecting one of the transfers. That is, the displayed transfers may be selectable via an input interface of the client device and selection may cause a transfer detail display to be output at the client device (for example, a display screen 1300 of the type described with reference to FIG. 13).

Accordingly, while the series of automated processing operations are being performed, the server 160 may, at operation 1412, receive, via the communications module, an indication of a selection of one of the transfers. The indication is sent by the client device when the interface element for selecting the transfer is activated. At operation 1414, in response to receiving the indication of the selection, the server 160 may retrieve stage state data from memory. The stage state data is the data stored by the server as it processes the various processing operations. The stage state data indicates a current one of the automated processing operations in the series.

Additionally or alternatively, the server may, at operation 1414, retrieve the external processing data which indicates, for example, hop information for the message.

Next, at operation 1416, the server may update the transfer interface. For example, the server 160 may send, to the client device, an indication of the stage state data. The client device may be configured to update the transfer interface in response to receiving the indication to display a representation of the series of automated processing operations which identifies one of the processing operations in the series as a current processing operation. By way of example, the server may, in response to receiving the indication, display a display screen 1300 of the type described with reference to FIG. 13.

The communication sent at operation 1416 may additionally or alternatively include an external processing indication based on the external processing data. The client device may be configured to update the transfer interface based on the external processing indication. By way of example, the server may, in response to receiving the external processing indication, display a display screen 1300 of the type described with reference to FIG. 13.

In at least some embodiments, the display screen 1300 may be dynamically updated by the server. More particularly, the server 160 may monitor for changes in the stage state data and, when a change is detected (operation 1418), may update the transfer interface (operation 1420). For example, when control proceeds to the next processing operation, the display screen 1300 may be automatically updated so that the current processing operation is reflected.

In some instances, the current processing operation in the transfer interface is selectable to input a processing command. The processing command may, for example, be a command to request input of a release command.

Accordingly, at operation 1422, the server 160 may receive an indication of the processing command and may, at operation 1424, perform a processing operation associated with the message based on the processing command. The processing operation may, for example, involve sending a notification to an administrator device associated with the current processing operation.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
   a communications module;
   a processor coupled to the communications module; and
   a memory storing processor-executable instructions which, when executed, configure the processor to:
      receive, via the communications module, a message representing a request for a transfer;
      perform a series of automated processing operations on the message, the processing operations including at least a first processing operation and a second processing operation;
      while the series of automated processing operations are being performed:
         provide, via the communications module and to a client device associated with an authenticated entity, a transfer interface, the transfer interface including an interface element for selecting the transfer;
         receive, via the communications module, an indication of a selection of the transfer;
         in response to receiving the indication of the selection, retrieve stage state data, the stage state data indicating a current one of the automated processing operations in the series;
         provide, to the client device and in real-time or near real-time, an updated transfer interface, the updated transfer interface including a representation of the series of automated processing operations and identifying one of the processing operations in the series as a current processing operation, the representation of the current processing operation selectable to input a processing command causing the server computer system to send an electronic message to a system performing the current processing operation, the electronic message including a request for further details about the current processing operation;
         determine, in real-time or near real-time, that the current processing operation has completed and update the stage state data to indicate that the current processing operation has completed and to indicate a next current processing operation; and
         responsive to determining that the current processing operation has been completed, enable, in real time or near real time, the representation of the next current processing operation as being selectable to input a processing command causing the server computer system to send an electronic message to a system performing the next current processing operation.

2. The server computer system of claim 1, wherein the first processing operation is performed by:
   evaluating the message based on first defined criteria to determine whether the message passes the first processing operation or fails the first processing operation;
   when the message fails the first processing operation:
      sending, via the communications module, a notification to an administrator device; and
      upon receiving a release command from the administrator device, determining that the message has passed the first processing operation; and
   when the message is determined to have passed the first processing operation:
      initiating the second processing operation for the message; and
      updating the stage state data stored in the memory to reflect that the second processing operation has been initiated.

3. The server computer system of claim 2, wherein the second processing operation is performed by:
   evaluating the message based on second defined criteria to determine whether the message passes the second processing operation or fails the second processing operation;
   when the message fails the second processing operation:
      repeatedly re-evaluating the message based on the second defined criteria until the message is determined to have passed the second processing operation; and
   when the message is determined to have passed the second processing operation:
      initiating a third processing operation for the message; and
      updating the stage state data stored in the memory to reflect that the third processing operation has been initiated.

4. The server computer system of claim 1, wherein the message includes a free format message and wherein at least one of the processing operations in the series evaluates whether the message includes required data and wherein the message is determined to have failed that one of the processing operations when the message does not include the required data.

5. The server computer system of claim 1, wherein at least one of the processing operations in the series compares data in the message to a blacklist and wherein the message is determined to have failed that one of the processing operations when the data in the message corresponds to an entry in the blacklist.

6. The server computer system of claim 1, wherein at least one of the processing operations in the series performs a resource check for a transferor associated with the message by querying a database to identify available resources for the transferor and wherein the message is determined to have failed that one of the processing operations when the transferor is determined to have insufficient resources.

7. The server computer system of claim 1, wherein the processor-executable instructions further configure the processor to:
   receive an indication of the processing command; and
   perform a processing operation associated with the message based on the processing command.

8. The server computer system of claim 1, wherein the processor-executable instructions further configure the processor to:
   send, via the communications module and to a third-party server, a request for external processing data associated with the message;
   receive, via the communications module and from the third-party server, the external processing data associated with the message; and
   send, to the client device, an external processing indication based on the external processing data, wherein the client device is configured to update the transfer interface based on the external processing indication.

9. The server computer system of claim 8, wherein the external processing data indicates hop information for the message.

10. The server computer system of claim 9, wherein the hop information indicates one or more of: a number of hops of a message, a fee at one or more of the hops, and an exchange rate applied at one or more of the hops.

11. A method performed at a server computer system, the method comprising:
receiving a message representing a request for a transfer;
performing a series of automated processing operations on the message, the processing operations including at least a first processing operation and a second processing operation;
while the series of automated processing operations are being performed:
providing, to a client device associated with an authenticated entity, a transfer interface, the transfer interface including an interface element for selecting the transfer;
receiving an indication of a selection of the transfer;
in response to receiving the indication of the selection, retrieving stage state data, the stage state data indicating a current one of the automated processing operations in the series;
providing, to the client device and in real-time or near real-time, an updated transfer interface, the updated transfer interface including a representation of the series of automated processing operations and identifying one of the processing operations in the series as a current processing operation, the representation of the current processing operation selectable to input a processing command causing the server computer system to send an electronic message to a system performing the current processing operation, the electronic message including a request for further details about the current processing operation;
determining, in real-time or near real-time, that the current processing operation has completed and updating the stage state data to indicate that the current processing operation has completed and to indicate a next current processing operation; and
responsive to determining that the current processing operation has been completed, enable, in real time or near real time, the representation of the next current processing operation as being selectable to input a processing command causing the server computer system to send an electronic message to a system performing the next current processing operation.

12. The method of claim 11, wherein the first processing operation is performed by:
evaluating the message based on first defined criteria to determine whether the message passes the first processing operation or fails the first processing operation;
when the message fails the first processing operation:
sending a notification to an administrator device; and
upon receiving a release command from the administrator device, determining that the message has passed the first processing operation; and
when the message is determined to have passed the first processing operation:
initiating the second processing operation for the message; and
updating the stage state data to reflect that the second processing operation has been initiated.

13. The method of claim 12, wherein the second processing operation is performed by:
evaluating the message based on second defined criteria to determine whether the message passes the second processing operation or fails the second processing operation;
when the message fails the second processing operation:
repeatedly re-evaluating the message based on the second defined criteria until the message is determined to have passed the second processing operation; and
when the message is determined to have passed the second processing operation:
initiating a third processing operation for the message; and
updating the stage state data to reflect that the third processing operation has been initiated.

14. The method of claim 11, wherein the message includes a free format message and wherein at least one of the processing operations in the series evaluates whether the message includes required data and wherein the message is determined to have failed that one of the processing operations when the message does not include the required data.

15. The method of claim 11, wherein at least one of the processing operations in the series compares data in the message to a blacklist and wherein the message is determined to have failed that one of the processing operations when the data in the message corresponds to an entry in the blacklist.

16. The method of claim 11, wherein at least one of the processing operations in the series performs a resource check for a transferor associated with the message by querying a database to identify available resources for the transferor and wherein the message is determined to have failed that one of the processing operations when the transferor is determined to have insufficient resources.

17. The method of claim 11, further comprising:
receiving an indication of the processing command; and
performing a processing operation associated with the message based on the processing command.

18. The method of claim 11, further comprising:
sending, to a third-party server, a request for external processing data associated with the message;
receiving, from the third-party server, the external processing data associated with the message; and
sending, to the client device, an external processing indication based on the external processing data, wherein the client device is configured to update the transfer interface based on the external processing indication.

19. The method of claim 18, wherein the external processing data indicates hop information for the message.

20. A non-transitory computer readable storage medium comprising processor-executable instructions which, when executed, configure a processor to:
receive a message representing a request for a transfer;
perform a series of automated processing operations on the message, the processing operations including at least a first processing operation and a second processing operation;
while the series of automated processing operations are being performed:
provide, to a client device associated with an authenticated entity, a transfer interface, the transfer interface including an interface element for selecting the transfer;

receive an indication of a selection of the transfer;
in response to receiving the indication of the selection, retrieve stage state data, the stage state data indicating a current one of the automated processing operations in the series;
provide, to the client device and in real-time or near real-time, an updated transfer interface, the updated transfer interface including a representation of the series of automated processing operations and identifying one of the processing operations in the series as a current processing operation, the representation of the current processing operation selectable to input a processing command causing a server computer system to send an electronic message to a system performing the current processing operation, the electronic message including a request for further details about the current processing operation;
determine, in real-time or near real-time, that the current processing operation has completed and update the stage state data to indicate that the current processing operation has completed and to indicate a next current processing operation; and
responsive to determining that the current processing operation has been completed, enable, in real time or near real time, the representation of the next current processing operation as being selectable to input a processing command causing the server computer system to send an electronic message to a system performing the next current processing operation.

* * * * *